United States Patent
Park

(10) Patent No.: US 7,383,123 B2
(45) Date of Patent: Jun. 3, 2008

(54) SYSTEM AND METHOD OF DISPLAYING POSITION INFORMATION INCLUDING AN IMAGE IN A NAVIGATION SYSTEM

(75) Inventor: Young-Sik Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 10/859,199

(22) Filed: Jun. 3, 2004

(65) Prior Publication Data

US 2004/0249565 A1  Dec. 9, 2004

(30) Foreign Application Priority Data

| Jun. 3, 2003 | (KR) | ................ 10-2003-0035744 |
| Jun. 3, 2003 | (KR) | ................ 10-2003-0035750 |

(51) Int. Cl.
*G01C 21/26* (2006.01)
(52) U.S. Cl. .................................................. 701/200
(58) Field of Classification Search ................. 701/200
See application file for complete search history.

(56) References Cited

U.S. PATENT DOCUMENTS

| 7,050,905 B2 * | 5/2006 | Nemeth ...................... 701/201 |
| 2001/0037305 A1 * | 11/2001 | Mochizuki .................... 705/52 |
| 2002/0047895 A1 * | 4/2002 | Bernardo et al. ............. 348/48 |

FOREIGN PATENT DOCUMENTS

| KR | 1020010094701 |  | 11/2001 |
| KR | 1020010094701 | A | 11/2001 |
| KR | 1020010097518 | A | 11/2001 |
| KR | 1020020034270 | A | 5/2002 |
| KR | 1020020071996 | A | 9/2002 |

* cited by examiner

*Primary Examiner*—Thu V. Nguyen
(74) *Attorney, Agent, or Firm*—Roylance, Abrams, Berdo & Goodman, L.L.P.

(57) ABSTRACT

A system and method of displaying position information including an image in a navigation system are disclosed. The navigation system has an information center and a mobile terminal. The information center includes a database for storing a node message with node image information about the geographical features of a node and a database for storing map data. The node image information is divided into image segments corresponding to directions. The information center sets a route according to a current position and a destination of the mobile terminal, generates map data including the route and nodes in the route, and transmits it to the mobile terminal. The mobile terminal selects nodes for which to receive node messages in the map data. The information center transmits a node message for the next node each time the mobile terminal reaches each of the selected nodes. The mobile terminal reproduces the node message.

18 Claims, 18 Drawing Sheets

(a) (b)

SYSTEM AND METHOD OF DISPLAYING POSITION INFORMATION INCLUDING AN IMAGE IN A NAVIGATION SYSTEM

PRIORITY

This application claims the benefit under 35 U.S.C. § 119(a) of an application entitled "Method of Displaying Position Information Including Image in a Navigation System" filed in the Korean Intellectual Property Office on Jun. 3, 2003 and assigned Serial No. 2003-35744, and of an application entitled "Method of Displaying Position Information Including Image in a Navigation System" filed in the Korean Intellectual Property Office on Jun. 3, 2003 and assigned Serial No. 2003-35750, the entire content of both of which are incorporated herein by reference.

BACKGROUND OF THE INVENTION

1. Field of the Invention

The present invention relates to a position displaying system and method in a navigation system. In particular, the present invention relates to a system and method of displaying information about a predetermined node including an image of the node during moving.

2. Description of the Related Art

A Global Positioning System (GPS) enabled mobile terminal can determine its position using signals received from its GPS receiver. The development of a GPS-based navigation system has brought about the proliferation of GPS-enabled navigation devices. Navigation devices equipped with a GPS receiver can store map information on a recording medium such as a compact disk (CD). As the navigation device moves, the GPS receiver detects the position of the navigation device and outputs the position information to the navigation device. The navigation device then displays its position on the map according to the GPS information. Or the navigation device downloads the map information and the position information from the GPS receiver and displays its position on the map. The navigation device can be a navigator in a vehicle or a mobile terminal.

In a conventional navigation system, when the mobile terminal selects an intended destination, an information center determines a route to the destination. During the movement of the mobile terminal, the information center provides information about nodes along the route as the mobile terminal reaches each of the nodes, thus displaying the current position of the mobile terminal on the map two-dimensionally or three-dimensionally.

However, the conventional navigation system cannot selectively provide information about user-desired nodes. Moreover, the mobile terminal's displaying position information received from the GPS device on the map has limitations in helping a user to be aware of the surroundings of the area. Thus, there is a need for a navigation system that allows the user to select intended nodes and transmit image information about the surroundings of the nodes to the user.

SUMMARY OF THE INVENTION

An object of the present invention is to substantially solve at least the above problems and disadvantages and to provide at least the advantages described below. Accordingly, an object of the present invention is to provide a system and method of transmitting image information about a node to a mobile terminal which the mobile terminal moves to during traveling.

Another object of the present invention is to provide a system and method of transmitting map data including nodes in a route to a destination to a mobile terminal when the mobile terminal sets the destination, and transmitting to the mobile terminal image information about the nodes that the mobile terminal moves to during traveling.

A further object of the present invention is to provide a system and method of generating map data including nodes in a route from a current position of a mobile terminal to a destination and transmitting image information about the next node when the mobile terminal reaches a node during traveling, so that the mobile terminal displays the image information to a user in a navigation system.

Still another object of the present invention is to provide a system and method of allowing a mobile terminal to set intended nodes when setting a destination and transmitting to the mobile terminal image information about the next nodes as the mobile terminal reaches the set nodes during traveling, so that the mobile terminal displays the image information to a user in a navigation system.

Yet another object of the present invention is to provide a system and method of allowing a mobile terminal to select intended nodes in a route to a destination and transmitting to the mobile terminal panoramic images of the selected nodes so that the mobile terminal displays the panoramic images according to its direction in a navigation system.

Yet a further object of the present invention is to provide a system and method of allowing a mobile terminal to select intended nodes to visit on the way to a destination, transmitting in real time to the mobile terminal map information and panoramic images of the selected nodes to be displayed on the mobile terminal, resetting a route from a current position to the destination when the mobile terminal gets off track, and transmitting online panoramic images of nodes in the reset route to be displayed on the mobile terminal in a navigation system.

The above objects are achieved by a system and method of displaying position information including an image in a navigation system.

According to one aspect of the present invention, in a navigation system having an information center and a mobile terminal, the information center includes a database for storing a node message with node image information about the geographical features of a node and a database for storing map data. The node image information is divided into image segments corresponding to directions. The information center sets a route according to a current position and a destination of the mobile terminal, generates map data including the route and nodes in the route, and transmits the map data to the mobile terminal. The information center transmits a node message for the first of the nodes to the mobile terminal, tracks the movement of the mobile terminal, and transmits a node message for a next node to a node where the mobile terminal reaches. When the mobile terminal reaches the last of the nodes, the information center terminates transmission of the node messages.

According to another aspect of the present invention, in a navigation system having an information center and a mobile terminal, the information center includes a database for storing a node message with node image information about the geographical features of a node and a database for storing map data. The node image information is divided into image segments corresponding to directions. The mobile terminal transmits navigation information including a current position and a destination to the information center, receives map data including a route from the current position to the destination and nodes in the route from the information center, displays a node message for the first of the nodes received from the information center. The mobile terminal also tracks its movement, requests from the information center a node message for a next node to a node where the mobile terminal reaches, and downloads the node message from the information center, and displays the node message. When the mobile terminal reaches the last of the nodes, it terminates the download of the node message. When the mobile terminal reaches the destination, it indicates its arrival at the destination on a display.

According to a further aspect of the present invention, in a navigation system having an information center and a mobile terminal, the information center includes a database for storing a node message with node image information about the geographical features of a node and a database for storing map data. The node image information is divided into image segments corresponding to directions. The information center calculates a route according to a current position and a destination of the mobile terminal, generates map data including the route and nodes in the route, and transmits the map data to the mobile terminal. The information center transmits node messages for all the nodes to the mobile terminal at a predetermined time, and waits. When the information center receives a route resetting request from the mobile terminal during the waiting period, it resets a route from a current position of the mobile terminal and the destination and transmits a node message to the mobile terminal. When the mobile terminal notifies the information center of its arrival at the last of the nodes, the information center terminates transmission of the node message.

According to still another aspect of the present invention, in a navigation system having an information center and a mobile terminal, the information center includes a database for storing a node message with node image information about the geographical features of a node and a database for storing map data. The node image information is divided into image segments corresponding to directions. The mobile terminal transmits navigation information including a current position and a destination to the information center, receives map data including a route from the current position to the destination and nodes along the route from the information center, selects nodes for which to receive node messages in the map data, and notifies the information center of the selected nodes. The mobile terminal downloads the node messages for the selected nodes from the information center, stores the node messages, and moves while displaying a node message for the first of the selected nodes. When the mobile terminal reaches each of the selected nodes, it displays node image information included in a node message for the next node. If the mobile terminal is off track, it transmits the navigation information to the information center, while requesting route resetting, and repeats the above steps. When the mobile terminal reaches the last node, it notifies the information center of its arrival at the last node. When the mobile terminal reaches the destination, it indicates its arrival at the destination.

According to yet another aspect of the present invention, in a navigation system having an information center and a mobile terminal, the information center includes a database for storing a node message with node image information about the geographical features of a node and a database for storing map data. The node image information is divided into image segments corresponding to directions, the mobile terminal transmits navigation information including a current position and a destination to the information center, receives map data including a route from the current position to the destination and nodes along the route from the information center, selects nodes for which to receive node messages in the map data, and requests transmission of the entire node messages of the selected nodes to the information center. The mobile terminal downloads the node messages for the selected nodes from the information center and stores the node messages. The mobile terminal displays the first of the node messages while moving. When the mobile terminal reaches each of the selected nodes, it displays a node message image for the next node. When the mobile terminal reaches the last node, it displays a node message for the destination. When the mobile terminal reaches its destination, it indicates its arrival at the destination on a display.

BRIEF DESCRIPTION OF THE DRAWINGS

The above and other objects, features and advantages of the present invention will become more apparent from the following detailed description when taken in conjunction with the accompanying drawings in which.

In the drawings, it should be noted that the same or similar elements are denoted by like reference numerals even though they are depicted in different drawings.

DETAILED DESCRIPTION OF THE PREFERRED EMBODIMENTS

Figure 1:
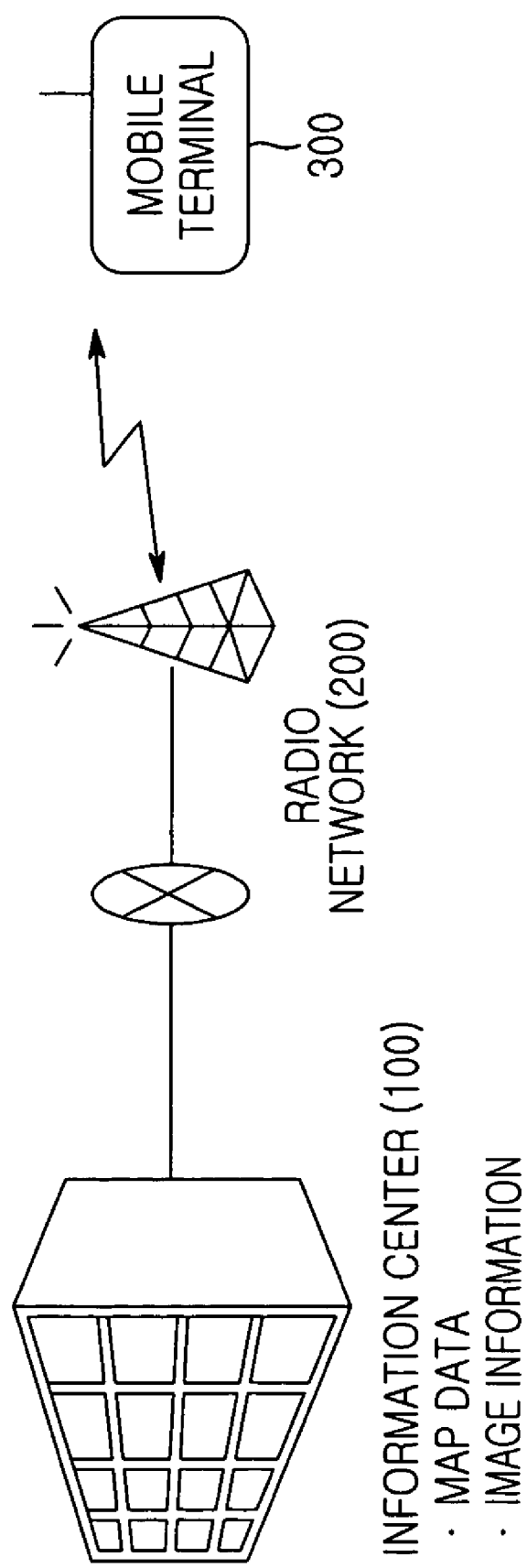
FIG. 1 is a schematic view illustrating a navigation system (or a geographic information system) according to an embodiment of the present invention.

Embodiments of the present invention will be described herein below with reference to the accompanying drawings. In the following description, well-known functions or constructions are not described in detail for conciseness.

In a navigation system according to the present invention, a mobile terminal displays virtual reality (VR)-images of predetermined nodes enroute to a destination when the mobile terminal moves to the nodes. The term node is used to refer to a location or anything along a predetermined route from a starting point to a destination. From the images as well as map data, thus, the user of the mobile terminal can be fully aware of the nodes to be visited.

Since it is troublesome to download image information about all the nodes enroute to a destination and reproduce the image information, the mobile terminal may download and display image information about some nodes of interest in advance prior to departure. Therefore, the user can be aware of the surroundings of the nodes beforehand. As the mobile terminal approaches the selected nodes, the images of the nodes can be reproduced automatically.

The image data of nodes can be constructed with 360-degree panoramic images. Thus, as the mobile terminal moves, it downloads and displays a portion of the 360-degree panorama images of nodes in corresponding to direction of movement of the mobile terminal.

The navigation service can be provided online or offline. In an online mode, once the user sets the point of departure and a destination, the navigation system determines a route to the destination. The determined route can comprise a shortest route between the origination and destination, a route with the least traffic congestion based on time of day information, and so on. As the mobile terminal moves along the route, the navigation system automatically tracks the route and transmits the image data of nodes to the mobile terminal. The mobile terminal then displays the image data. If the mobile terminal is off track, the navigation system automatically resets the route and provides the navigation service regarding the reset route. The user can select nodes in the route in the online mode, too.

In an offline mode, when the user sets a destination at departure, the navigation system determines a route to the destination and the mobile terminal downloads the image data of nodes along the route in advance. As the mobile terminal moves, the downloaded image data is displayed. The user can select intended nodes to be visited so that the image data of the selected nodes are displayed. If the mobile terminal is off track during the navigation service in the offline mode, the mobile terminal is transitioned to the online mode to thereby continue the navigation service.

Terms as used herein will be defined. A node is a waypoint of which the image data is to be displayed on the mobile terminal in a route that the mobile terminal takes. A 360-degree panoramic image of a node shows real-world scenes (neighborhood facilities) of the node, as the image information of the node. While a panoramic image is taken in an embodiment of the present invention, it can be further contemplated that multiple images in each possible direction that the mobile terminal can take from a node are saved and joined into a panoramic image. A mobile terminal is defined as a device that can display a route taken. Thus, the mobile terminal can be any device capable of determining its position with the aid of a GPS receiver or a base station while moving.

The navigation system in an embodiment of the present invention services the geographic information of a node based on position information and image information of the node. To accomplish this, the navigation system is provided with a destination and a route setting method, receives position information from GPS satellites or a base station, and calculates the current position of the mobile terminal based on the position information. After calculating a route from a departure point to the destination, the navigation system displays on a map all nodes of which the images can be provided. Because downloading and displaying in real time node messages related to the nodes including nodes that the user is already familiar with requires a large volume of computation and is troublesome to the user, the user selects only nodes of interest when the route is set prior to departure. The node messages are reproduced in either of the following two exemplary methods.

A first method is to download the data of the selected nodes only and reproduce it in real time while traveling. A panoramic image of the nearest new node in the direction that the mobile terminal travels is downloaded and reproduced, while the position of the next node is displayed and the current position of the mobile terminal is updated. Until arrival at the destination, the current position of the mobile terminal, the image reproduction of the next node, indication of a node of which the image is being reproduced, and indication of nodes of which the images are available are repeated visually on the mobile terminal.

A second method is to download node messages related to the selected nodes and save them prior to departure. Since it is possible to reproduce the images of particular nodes prior to departure, the user can be aware of the surroundings of the nodes in advance. As the mobile terminal approaches the selected nodes while traveling, the images are automatically reproduced. This method is viable as long as the mobile terminal has a large memory capacity to store the node messages.

An embodiment of the present invention will be described below, focusing on the former method in which a mobile terminal downloads a node message related to a selected node during traveling. Subsequently, the latter method will be described with reference to FIG. 16.

In an embodiment of the present invention, when an information center determines a route to the destination of a user, a mobile terminal selects nodes of interest along the route. Each time the mobile terminal reaches each of the selected nodes, it downloads a node message about the next node from the information center and displays it. The node message includes node data and node image information. The node data is position information about the node and the node image information has photo images of the surroundings of the nodes. That is, the mobile terminal receives information about its current position from a GPS receiver, receives position data and images about a selected node, and displays them so that the user can view the real-world scenes of the next node in the direction that the user travels. Thus, an embodiment of the present invention provides a navigation system that transmits and displays images of nodes in the direction the mobile terminal moves. While the downloaded images are assumed to be panoramic images in an embodiment of the present invention, they also may include conventional image information containing bearing information.

In the navigation system, the information center receives information about the position of the mobile terminal from the GPS receiver. Then, the information center (or the GPS receiver) transmits a panoramic image of the surroundings of the location of the mobile terminal. Thus the mobile terminal displays in real time full-view 360-degree panoramic images of selected nodes in the direction that it moves. Because reproduction of the full-view panoramic images creates too much data to be processed, an embodiment of the present invention provides a method of selectively downloading and reproducing the panoramic images. An embodiment of the present invention also provides a method of efficiently downloading and reproducing information about the current position and direction from the GPS receiver and the whole or portion of a panoramic image by prioritizing the information.

In the navigation system, the mobile terminal receives its position information from the GPS receiver and notifies the information center of its position. The information center then transmits image information about real-world scenes in relation to the position of the mobile terminal. That is, the navigation system will be described in the context that the mobile terminal receives position information from the GPS receiver, downloads and displays map data and image information in relation to the position of the mobile terminal in real time from the information center, and displays them. Yet, the map data can be already stored in an internal memory, or downloaded from the GPS receiver. Also, the image information can be downloaded from another entity such as the GPS.

FIG. 1 is a schematic view of the navigation system according to an embodiment of the present invention. The navigation system is characterized by the provisioning of a navigation service through a mobile terminal 300.

The navigation system comprises an information center 100, a radio network 200, and the mobile terminal 300.

The information center 100 has map data and node messages. Each of the node messages contains node data indicating the position of a node and node image information providing a photo image of a real-world scene at the node according to an embodiment of the present invention. Upon request for the navigation service from the mobile terminal 300, the information center 100 generates appropriate navigation information based on the map data and the image information and provides the navigation information to the mobile terminal 300 over the radio network 200. For example, when the mobile terminal 300 requests information on the best route from the current position to a destination, the information center 100 transmits to the mobile terminal 300 map data containing nodes for which node messages can be delivered. If the mobile terminal 300 selects the desired nodes, the information center 100 transmits to the mobile terminal 300 the node data and node image information of the selected nodes along with the movement of the mobile terminal 300.

The radio network 200 serves as a path in which information is delivered between the information center 100 and the mobile terminal 300. A Personal Communications Service (PCS) system or a digital cellular system such as IS-95A, 95B or 95C can be used as the radio network 200. Or the radio network 200 can be a Code Division Multiple Access (CDMA) digital cellular system such as International Mobile Telecommunications-2000 (IMT-2000) or Universal Mobile Telecommunication System (UMTS) which have recently been actively studied. When interactive satellite broadcasting technology is developed, the radio network 200 may be a satellite broadcasting network.

The mobile terminal 300 can be any type of mobile terminal as long as it can determine its position with the aid of a GPS receiver or a base station. A mobile phone is taken as the mobile terminal 300 herein, by way of example. Hence, the mobile terminal 300 operates in a navigation mode for supporting the navigation function according to an embodiment of the present invention as well as in a typical voice mode for providing a voice call service. In the navigation mode, the mobile terminal 300 is connected to the radio network 200, receives navigation information from the information center 100, and provides the navigation information to a user.

The user sets the current position and a destination through the mobile terminal 300 and requests information on the best route from the information center when the mobile terminal is in the navigation mode. Thus, the information center 100 guides the user to the best route between the current position and the destination using a conventional navigation function. The map data that the mobile terminal 300 downloads from the information center 100 contains nodes for which node messages can be issued. When the user selects nodes of interest, the information center 100 transmits a node message related to the next node to the mobile terminal 300 at a selected node. The user can set the destination and the nodes by entering facility names, area categories, district names, telephone numbers, or longitudes and latitudes by voice or in text. In the navigation mode, the user is connected to the information center 100 through the mobile terminal 300 and receives image information about surrounding facilities from the information center 100.

For example, if the user sets the current position and a destination through the mobile terminal 300 and requests information on the best route from the information center when the mobile terminal is in the navigation mode. The set information is provided to the information center 100 over the radio network 200. In response to the request, the information center 100 calculates the best route between the current position and the destination referring to map data stored internally and transmits to the mobile terminal 300 over the radio network 200 map data containing nodes along the best route. Upon receipt of the map data, the mobile terminal 300 selects nodes of interest among the nodes included in the map data and notifies the information center 100 of the selected nodes. If the mobile terminal 300 starts to move and approaches the selected nodes, the information center 100 provides the node data and node image information of the nodes, audibly and or visually. Visual node information is displayed on a display of the mobile terminal 300, and audible route guidance information is output through a speaker of the mobile terminal 300. By this route guidance service, a route to take is displayed, a notification message is output audibly, and information about guide waypoints and the remaining distance to the destination is provided.

While navigation information is transmitted between the information center 100 and the mobile terminal 300 over the radio network 200 in the navigation system, if the information center 100 and the mobile terminal 300 each have a GPS device and communicate navigation information through the GPS devices, the navigation system can be implemented without the radio network.

Figure 2:
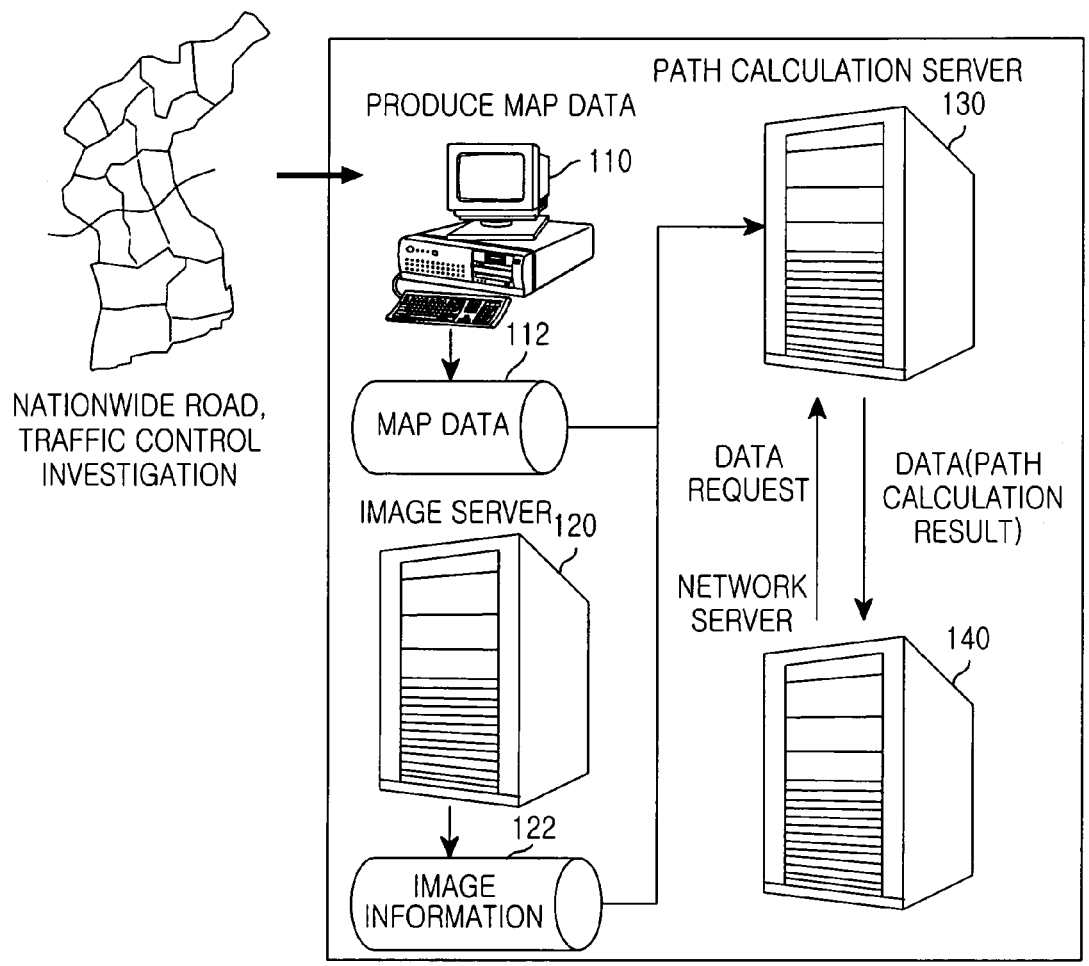
FIG. 2 is a block diagram illustrating an information center illustrated in FIG. 1.

FIG. 2 is a block diagram illustrating the information center 100.

Referring to FIG. 2, the information center 100 includes a computer 110, an image server 120, a route calculating server 130, a network server 140, a map data storage 112, and an image information storage 122. The computer 110 constructs map data according to roads and traffic regulations. In the map data, nodes for which node messages can be issued are marked. The map data is stored in the map data storage 112 or a database. The image server 120 stores the real-scenes of nodes on the map, generates the image information of the nodes with the photos, and stores in real time image information corresponding to the position of the mobile terminal 300 in the image information storage 122. The real-time information refers to images of real-scenes at significant nodes in the direction the mobile terminal 300 moves. Upon request for data from the network server 140, the route calculating server 130 calculates the best route from a current position at which the mobile terminal 300 will be located and a destination based on the map data and image information stored in the map data storage 112 and the image information storage 122. While guiding the mobile terminal 300 along the best route, the route calculating server 130 generates the image information of real-scenes of significant nodes. The network server 140 connects the information center 100 to the radio network 200.

As described above, the information center 100 has map data and image information stored therein. It transmits in real time map data by which to guide the mobile terminal 300 along the best route from the current position to a destination and photo images of significant nodes which the mobile terminal 300 will encounter. The nodes can be road intersections such as a three-way junction, a crossroad, and a rotary, government offices, public facilities, tour sites, major buildings, toll gates, interchanges, or waypoints in the neighborhood of the destination.

The radio network 200 transmits information about the current position and destination of the vehicle received from the mobile terminal 300 to the information center 100. Upon request for route guidance information from the mobile terminal 300, the radio network 200 provides the mobile terminal 300 with the route guidance information received from the information center 100. This radio network is wirelessly connected to the mobile terminal 300, for providing a radio connection service. The radio network 200 can be an existing CDMA digital cellular system or a PCS system. Or it can be an IMT-2000 system or an interactive satellite broadcasting network.

Figure 3:
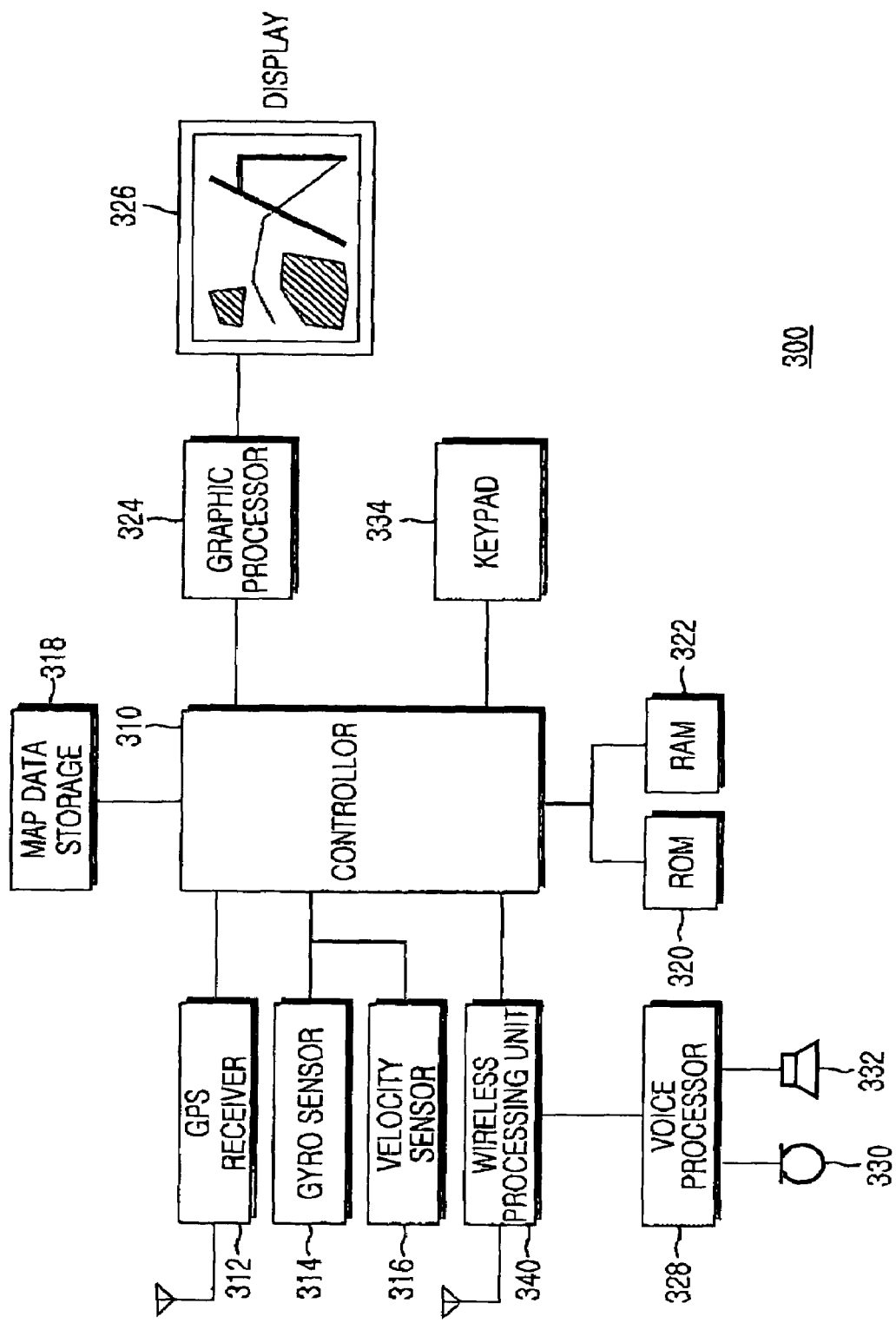
FIG. 3 is a block diagram of a mobile terminal illustrated in FIG. 1.

FIG. 3 is a block diagram of the mobile terminal 300 illustrated in FIG. 1. The mobile terminal 300 can be mounted to a vehicle or carried by a user, while the user moves. While the mobile terminal is described as a portable phone, it can also be a navigation device mounted in a vehicle.

Referring to FIG. 3, a GPS receiver 312 receives signals from a plurality of GPS satellites through an antenna. A gyro sensor 314 and a velocity sensor 316 collectively form a sensor unit. If the mobile terminal 300 is mounted in a vehicle, the gyro sensor 314 and the velocity sensor 316 sense the rotation and velocity of vehicle wheels. If the mobile terminal 300 is not in a vehicle, the outputs of the gyro sensor 314 and the velocity sensor 316 may not be used. A map data storage 318 has map data and additional information stored therein. The map data can be downloaded from the information center 100, or be pre-stored on a storage medium like a Compact Disc Read Only Memory (CD ROM). In the former case, when a navigation mode is set, the mobile terminal 300 requests a download of map data from the current position to a destination from the information center 100 and stores the downloaded map data in the map data storage 318, In the latter case, the map data storage 318 is typically stored on a CD ROM. Therefore, the map data storage 318 can be a memory device such as an optical disk, a hard disk, and so on.

A controller 310 provides overall control for mobile communication and navigation. If the user wants to use the navigation function, the user transmits information about the current position and the destination and selects nodes for display among the nodes given on a map. The mobile terminal 300 transmits information about its position which varies as it moves and controls the display of a node message received at a node. The position of the mobile terminal 300 can be displayed in the following manner.

In the case where the user carries the mobile terminal 300, the controller 310 calculates a current pseudo-position of the mobile terminal 300 based on the velocity of the mobile terminal 300 sensed by the sensor unit and selects one of the current pseudo-position and the pseudo-coordinates of the current position of the mobile terminal 300 received from the GPS receiver 312. If an accumulation error in the sensor unit is small, the calculated current pseudo-position is selected. If the accumulation error is great, the accumulation error is compensated for using the value received from the GPS receiver 312. Also, the controller 310 calculates the velocity and direction of the mobile terminal 300 as well as its current position. The controller 310 reads map data showing the neighborhood of the position where the mobile terminal 300 is located from the map data storage 318 according to the calculated information, and visually displays the map data on a display 326, outputting it through a speaker 330 audibly.

In the case where the mobile terminal 300 is located in a vehicle, the controller 310 calculates the current pseudo-position of the vehicle based on the rotation angle and velocity of the vehicle received from the sensor unit and selects one of the calculated pseudo-position and the pseudo-coordinates for the current position of the vehicle received from the GPS receiver 312. If an accumulation error in the sensor unit is small, the calculated current pseudo-position is selected. If the accumulation error is great, the accumulation error is compensated for using the value received from the GPS receiver 312. Also, the controller 310 calculates the velocity and direction of the vehicle as well as its current position. The controller 310 reads map data showing the neighborhood of the position where the mobile terminal 300 is located from the map data storage 318 according to the calculated information, and visually displays the map data on a display 326, outputting it through the speaker 330 audibly.

The controller 310 provides the information center 100 the position of the mobile terminal 300 through the radio network 200. The information center 100 tracks the route that the mobile terminal 300 has taken, accesses image information about the surroundings of important nodes in the route, and transmits the image information to the mobile terminal 300 through the radio network 200. The controller 310 displays the received image information.

In addition to its basic function, The controller 310 also guides the mobile terminal 300 along the best route from the current position to the destination. A ROM 320 and a RAM (Random Access Memory) 322 temporarily store programs for the operations of the controller 310 and data processed during the operations.

A graphic processor 324 processes the route information calculated by the controller 310 into visual data that the user can view. The display 326 displays the visual data. The display 326 can be a Cathode Ray Tube (CRT) or a Liquid Crystal Display (LCD).

A voice processor 328 processes the route information into voice data that the user can hear. A speaker 330 outputs the voice data. The graphic processor 324 and the voice processor 328 process the map data read from the map data storage 318 and condition information generated during execution of functions into visual and voice data, respectively.

How the mobile terminal 300 downloads image information from the information center 100 and displays it in the navigation system having the above-described configuration will be described below.

In an initial stage, the mobile terminal 300 selects a navigation function, is connected to the information center 100, and transmits current position and destination information to the information center 100. The information center 100 analyzes the received information, calculates the best route, and transmits map data having nodes to the mobile terminal. The mobile terminal 300 then selects intended nodes for display and the information center 100 transmits a node message including node data and node image information of the next node that the mobile terminal 300 will encounter.

In a moving stage, the mobile terminal 300 stores the node message in memory. While displaying the node image information of the next node in the direction that the mobile terminal 300 travels, the mobile terminal 300 generates information indicating its current position through the GPS receiver, the gyro sensor 314, and the velocity sensor 316, and transmits it to the information center 100 in real time. This procedure continues until the current position of the mobile terminal 300 is identical to the final destination.

Meanwhile, if the mobile terminal 300 gets off track, it is reconnected to the information center 100. The mobile terminal 300 provides the current position information to the information center 100. While traveling from the current position to the destination, the mobile terminal 300 receives image information of each selected node and displays it in the above manner.

On the side of the information center 100, it determines whether the user of the mobile terminal 300 is an authorized subscriber, upon receipt of a navigation service request from the mobile terminal. If the user is an authorized subscriber, the information center 100 finds the current position and the destination of the vehicle from data received from the mobile terminal 300, and determines the best route between the current position and the destination by referring to the map database and the image database. The information center 100 generates node messages for the nodes selected by the mobile terminal 300 and transmits them to the mobile terminal 300.

The above method can be used offline and online. In the offline mode, however, after the information center 100 determines the best route between the current position and the destination and the mobile terminal 300 selects nodes of which the images are to be displayed, the mobile terminal 300 downloads image information about all the selected nodes. According to the offline node image displaying method, the mobile terminal 300 is connected to the information center 100 only in the initial stage in which it downloads map data and node messages from the information center 100. While traveling, the mobile terminal 300 performs a navigation operation based on the downloaded information.

Figure 4A:
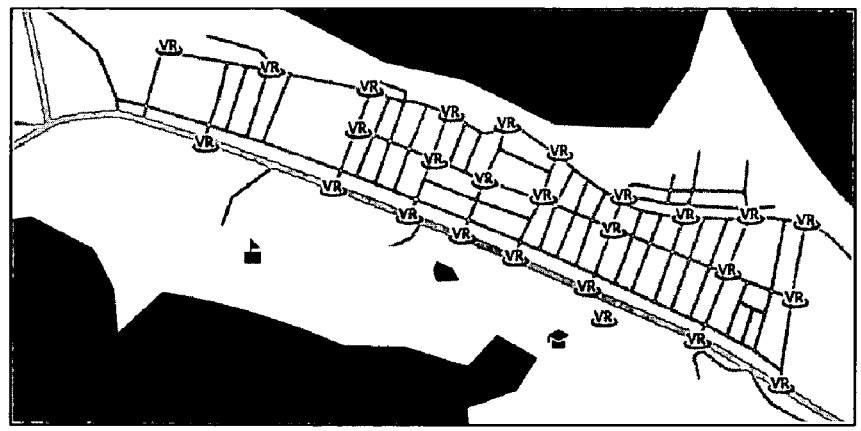
FIGS. 4A and 4B illustrate exemplary maps having node positions marked.
Figure 4B:
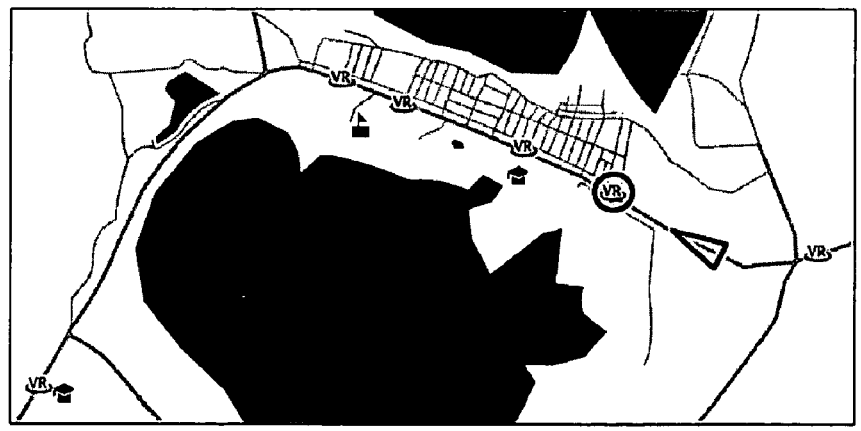

FIGS. 4A and 4B illustrate exemplary maps illustrating node positions marked therein. Specifically, FIG. 4A illustrates a map showing all nodes along a route and FIG. 4B illustrates a map showing only user-selected nodes along the route.

Referring to FIGS. 4A and 4B, when the mobile terminal 300 sets a navigation mode and transmits information about its current position and a destination to the information center 100, the information center 100 transmits map data illustrated in FIGS. 4A and 4B in which nodes are set along a route to the destination. Node messages can be generated regarding the nodes. The user of the mobile terminal 300 selects some of the nodes on the map and the resulting map displaying only the selected nodes is illustrated in FIG. 4B. In FIGS. 4A and 4B, VR denote the positions of nodes for which node messages can be generated.

Figure 5:
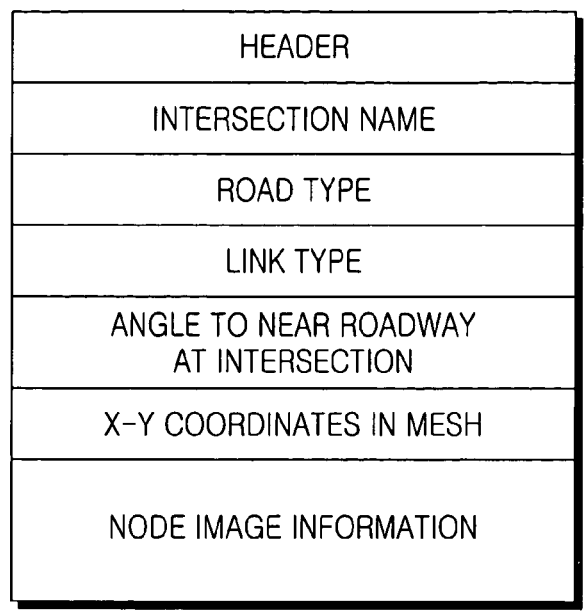
FIG. 5 illustrates the format of a node message according to an embodiment of the present invention.

FIG. 5 illustrates the format of a node message that the information center 100 generates regarding a node selected by the mobile terminal 300 according to an embodiment of the present invention.

Referring to FIG. 5, the node message includes node data related to the position of the node and node image information being photo images of the surroundings (surrounding facilities) of the node. The node data is divided into a header and node point information. The node point information includes intersection name, road type, link type, angle to a nearby roadway at an intersection, and X-Y coordinates in a mesh. The intersection name is given in text data, for example, "Grinn and Barret (West Chester, Ohio)". The road type identifies a road such as an expressway, a state road, or a local road. The link type identifies a link such as a U-turn, a rotary, an overpass, an underpass, or a bridge. The angle to a near roadway at an intersection can be an angle to enter an intersection (In), an angle to exit from the intersection (Out), an angle of a left road to a true North exit road (Left) at the intersection, or an angle of a right road to a true North exit road (Right) at the intersection.

The node image information can be photo images of the surroundings of predetermined nodes. The photo images can be 360-degree full-view images in the four directions of the nodes. In an embodiment of the present invention, the 360-degree full-view images are called panoramic images. The surroundings of a node are photographed in a 360-degree field of view and their panoramic image is stored as image information of the node.

Figure 6:
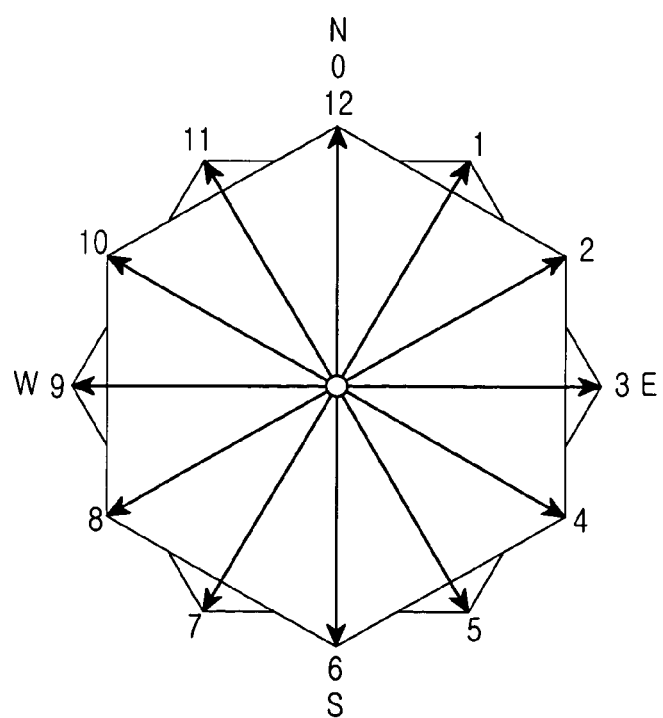
FIG. 6 illustrates exemplary directions ranging from 0 to 360 degrees available to the mobile terminal at a node.
Figure 7A:
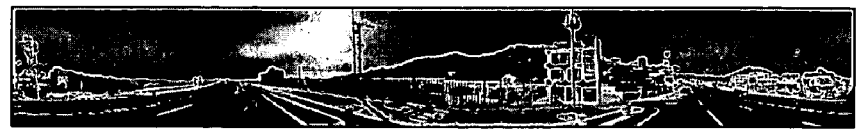
FIGS. 7A, 7B and 7C illustrate panoramic images of nodes when the nodes comprise a straight road, a three-way junction, and a crossroad, respectively.
Figure 7B:
Figure 7C:
Figure 8:
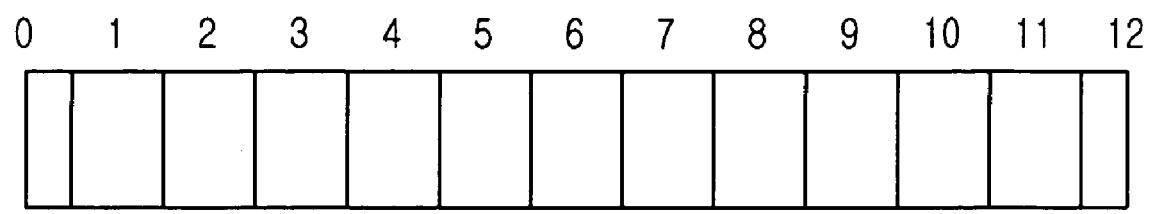
FIG. 8 illustrates segments of the panoramic image illustrated in FIG. 7A, 7B or 7C in relation to directions of the mobile terminal.

FIG. 6 illustrates directions that the mobile terminal 300 can take over a 360-degree range. FIGS. 7A, 7B and 7C illustrate examples of panoramic images in relation to directions of the mobile terminal 300 illustrated in FIG. 6. Specifically, FIG. 7A illustrates a panoramic image of a node when the node is a straight road, FIG. 7B illustrates a panoramic image of a node when the node is a three-way junction, and FIG. 7C illustrates a panoramic image of a node when the node is a crossroad. FIG. 8 illustrates segments of a panoramic image as illustrated in FIG. 7A, 7B or 7C corresponding to directions of the mobile terminal 300. The panoramic image segments are matched to the directions illustrated in FIG. 6 in a one-to-one relationship.

Referring to FIGS. 4A through 8, when the mobile terminal 300 sets a navigation mode and requests a navigation service, the information center 100 transmits to the mobile terminal 300 the map data illustrated in FIG. 4A by which a route between the current position and a destination of the mobile terminal is set. The map data includes nodes in the route, for which node messages can be generated. When the user of the mobile terminal 300 selects the desired nodes to be displayed in the map data illustrated in FIG. 4A, the information center 100 generates the map data illustrated in FIG. 4B. Thus, a route that the mobile terminal 300 wants to take is set using the selected nodes.

As the mobile terminal 300 moves, a route guidance service is provided. That is, the mobile terminal 300 tells the information center 100 its current position determined by its GPS receiver, and the information center 100 determines whether the current position of the mobile terminal 300 matches the selected route. If they are identical, the information center 100 analyzes the mobile terminal 300's previous position with its current position and thus determines the direction of the mobile terminal 300. Then the information center 100 transmits a panoramic image of the next node in the direction of travel. FIG. 6 illustrates directions that the mobile terminal 300 can take. While more directions can be defined, 360 degrees are divided into 12 portions and the directions are used clockwise in an embodiment of the present invention. If the current direction is a 6 o'clock direction (true South) in FIG. 6, a 360-degree full view can be provided by a panoramic image of the next crossroad. In FIG. 8, the leftmost number 0 and the rightmost number 12 represent images that can be connected to form a spherical panoramic image.

Although it is possible to reproduce a 360-degree full panoramic image of real-world scenes, transmission of the entire panoramic image results in a large volume of data and an increase in processing time. Therefore, if the user moves fast in a vehicle or uses a communication network with a limited transmission bandwidth, many constraints are imposed. Regarding the current position and direction of the mobile terminal 300, the panoramic image can be transmitted in the following manner.

In the case of transmitting the entire panoramic image, it is sequentially transmitted and reproduced, or it is transmitted and reproduced selectively in segments according to priority levels in the direction of travel. In the former method, if the image information is not significant or transmission and reproduction can be performed very fast, transmission and reproduction of the whole panoramic image as illustrated in FIG. 7A, 7B or 7C does not matter. In the latter method, it may occur that significant views are supposed to be displayed earlier than others according to the direction of travel. When the mobile terminal moves in the 6 o'clock direction in FIG. 6, segments of a panoramic image as illustrated in FIG. 7A, 7B or 7C are prioritized and correspondingly displayed in the exemplary order of 6-6-7-4-8-3-9-2-10 in FIG. 8. Thus, the panoramic image can be sequentially transmitted in a zig-zag manner according to the priority levels of the segments of the panoramic image.

In the case of partially transmitting the panoramic image, two ways can be considered: one is sequential transmission and reproduction and the other is priority-based transmission and reproduction.

In the former method, segments of the panoramic image within a predetermined angle in a travel direction are sequentially transmitted and reproduced due to limitations in data transmission bandwidth and processing speed. In the latter method, segments of the panoramic image within a predetermined angle in a travel direction are transmitted and reproduced according to their priority levels due to limitations in data transmission bandwidth and processing speed. For example, if the mobile terminal 300 travels in the 6 o'clock direction in FIG. 5, five images of a panoramic image in the exemplary 6-5-7-4-6 o'clock directions are transmitted and reproduced according to their priority levels.

The mobile terminal 300 can automatically join the downloaded images to a panoramic image by rotating them. When necessary, the mobile terminal 300 can stop reproduction of a predetermined image and enlarge or contract the image by zooming-in or zooming-out.

The downloaded node image information can be displayed along with map data in various ways. If the display 326 of the mobile terminal is large enough, it suffices to display the map data and the image information. However, if the display 326 is small, it is difficult to display the entire map data and image information. Therefore, embodiments of the present invention propose the three following methods of displaying the map data and the image information.

Figure 9A:
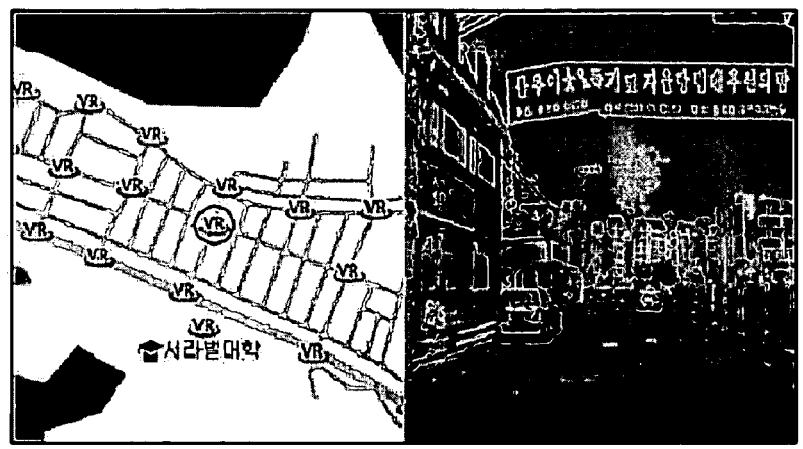
FIGS. 9A, 9B and 9C illustrate images of map data and image information included in a node message according to an embodiment of the present invention.

One embodiment of the present invention is to display the map and the real-world image simultaneously on the display 326. Irrespective of the size of the display 326, if the user wants to view the map and the image together, they are displayed as illustrated in FIG. 9A.

Figure 9B:
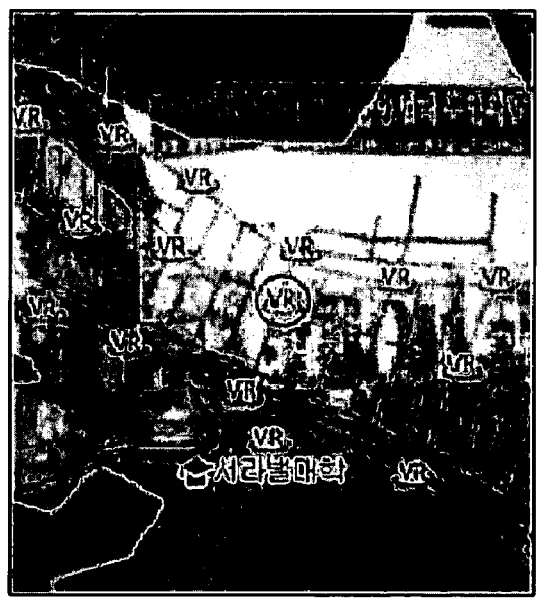

Another embodiment of the present invention is to overlap the map and the real-world image on the display 326. Although the display 326 is small, if the user wants to view the map and the real-world image, they are displayed as illustrated in FIG. 9B. The weight of transparency is controlled during the blending of the two images.

Figure 9C:
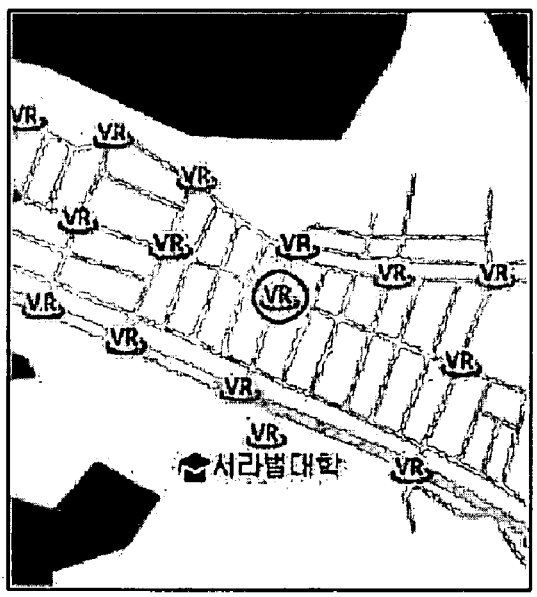
Figure 9C:
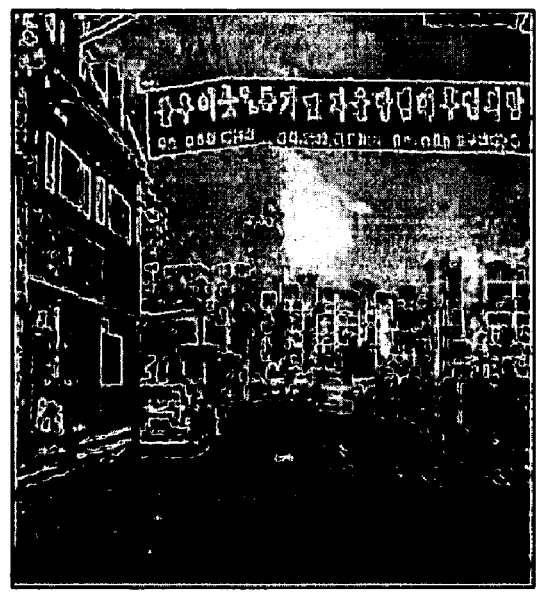

Yet another embodiment of the present invention is to sequentially display the map and the real-world image as illustrated in FIG. 9C. That is, the map and the real-world image are alternately displayed enlarged and illuminated on the display 326. The reproduction time ratio of the map to the real-world image and a repetition period can be selected as appropriate.

In an embodiment of the present invention, the navigation service can be provided online or offline. In the online mode, the information center 100 is connected to the mobile terminal 300 and detects the movement of the mobile terminal 300, to thereby provide the navigation service. Each time the mobile terminal 300 passes through a node, the information center 100 recognizes the movement of the mobile terminal 300 and transmits a node message to the mobile terminal 300. When the mobile terminal 300 gets off track, the information center 100 determines the current position of the mobile terminal 300, resets a route, and continues the navigation service. On the other hand, in the offline mode, the user sets a route from the departure to the destination. When the mobile terminal 300 gets off track, the user resets the route by inputting route information. If the mobile terminal 300 transmits position information to the information center 100, the information center 100 can transmit the node message correspondingly. Or after downloading node message regarding all nodes in the route to the destination in an initial route setting stage, the mobile terminal 300 can perform the navigation function.

A description of the online service will be followed by that of the offline service.

Figure 10:
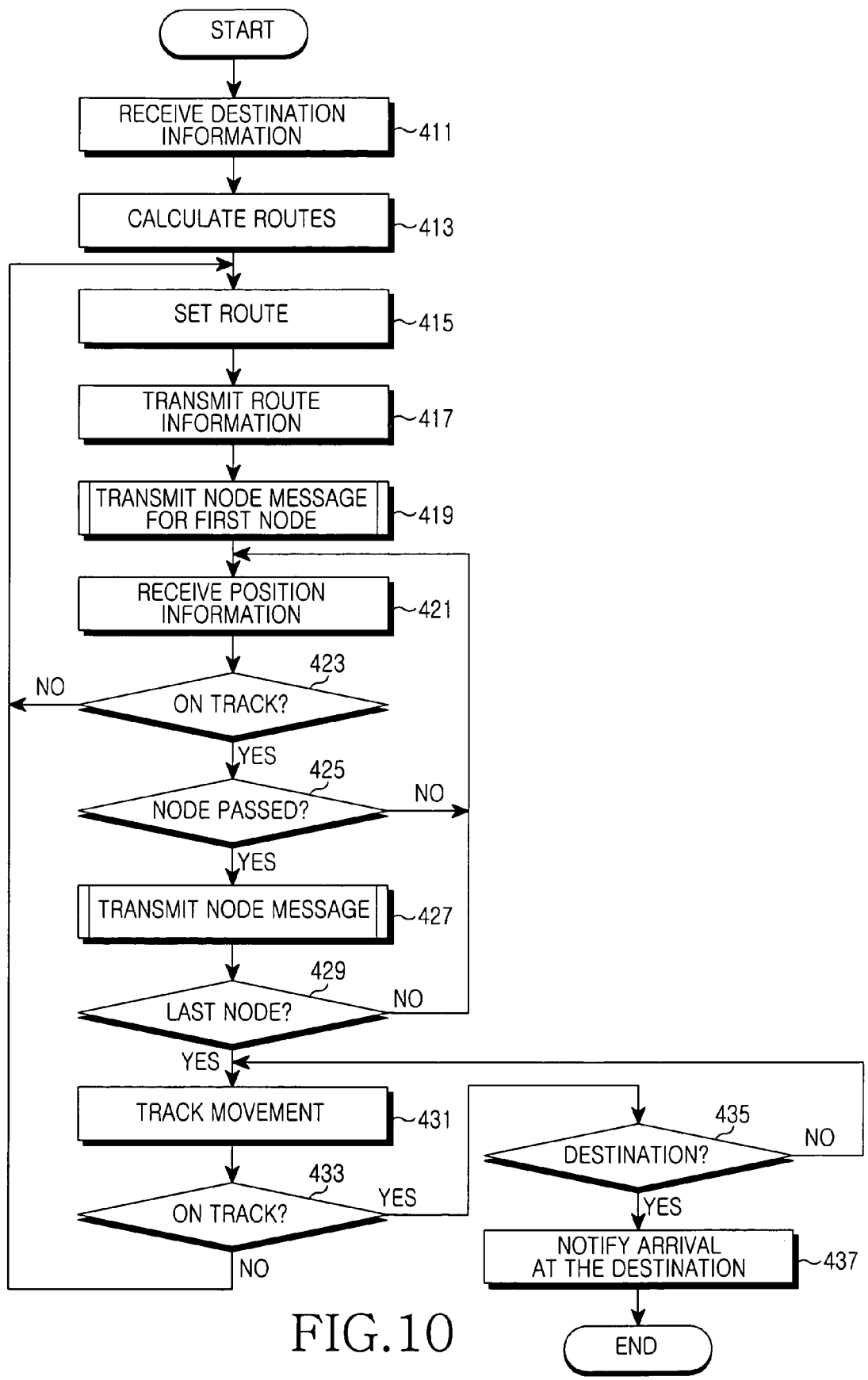
FIG. 10 is a flowchart illustrating an operation in the information center for processing information about each node along with the movement of the mobile terminal according to an embodiment of the present invention.

FIG. 10 is a flowchart illustrating an online navigation service method according to an embodiment of the present invention. As described above, the mobile terminal 300 downloads node messages for selected nodes in real time and reproduces them. The online navigation service procedure will be described based on the operation of the information center 100.

Referring to FIG. 10, when the user sets an online navigation mode, the mobile terminal 300 transmits information about its current position and a user-selected destination to the information center 100. The destination can be set by address, geographical name, or building name. The information center 100 receives the current position and destination information from the mobile terminal 300 in step 411 and detects the current position and calculates different routes between the current position and the destination in step 413. The current position is detected by receiving information about the current position (longitude and latitude) and the destination, searching the map data storage 112 for a matching geographical name, or facility item, and converting the searched geographical name or facility to longitude and latitude coordinates. Regarding calculation of the route, the information center 100 calculates routes between the current position and the destination using the map data storage 112 and the image information storage 122 and transmits map data including the routes and route selection information to the mobile terminal 300. The map data contains nodes for which node messages can be transmitted, as illustrated in FIG. 4A. The map data may include a plurality of routes from the current position to the destination. The map data may also include information about the shortest time to be taken, a short cut, and roads to take.

The mobile terminal 300 can select an intended route in the map data. It can also make choices regarding the shortest time, a short cut, and roads to take, for route setting. Then, the mobile terminal 300 notifies the information center 100 of the selected route. The information center 100 determines the selected route as the route for the mobile terminal 300 in step 415 and transmits map data illustrating the determined route in step 417. The map data has nodes for which VR service is available in the determined route as illustrated in FIG. 4B.

Steps 415 and 417 can be omitted. In this case, the information center 100 transmits the map data as illustrated in FIG. 4A to the mobile terminal 300 and transmits the mobile terminal 300 a node message for the next node each time the mobile terminal 300 passes a node. That is, the user of the mobile terminal 300 selects the best route and selects intended nodes on the selected route in step 415 and 417. Without these steps, the information center 100 tracks the movement of the mobile terminal 300 and transmits node messages for all nodes that the mobile terminal 300 reaches.

In step 419, the information center 100 transmits to the mobile terminal 300 a node message for the first node that the mobile terminal 300 will reach. The mobile terminal 300 displays the node message. The node message includes node data and node image information as illustrated in FIG. 5. The node image information can be a 360-degree panoramic image as illustrated in FIGS. 7A, 7B and 7C. The node message downloading is performed in a procedure illustrated in FIG. 11 or FIG. 12. The node image information is divided into image segments as illustrated in FIG. 8 and some of the image segments can be selectively transmitted according to the direction of the mobile terminal 300.

Figure 11:
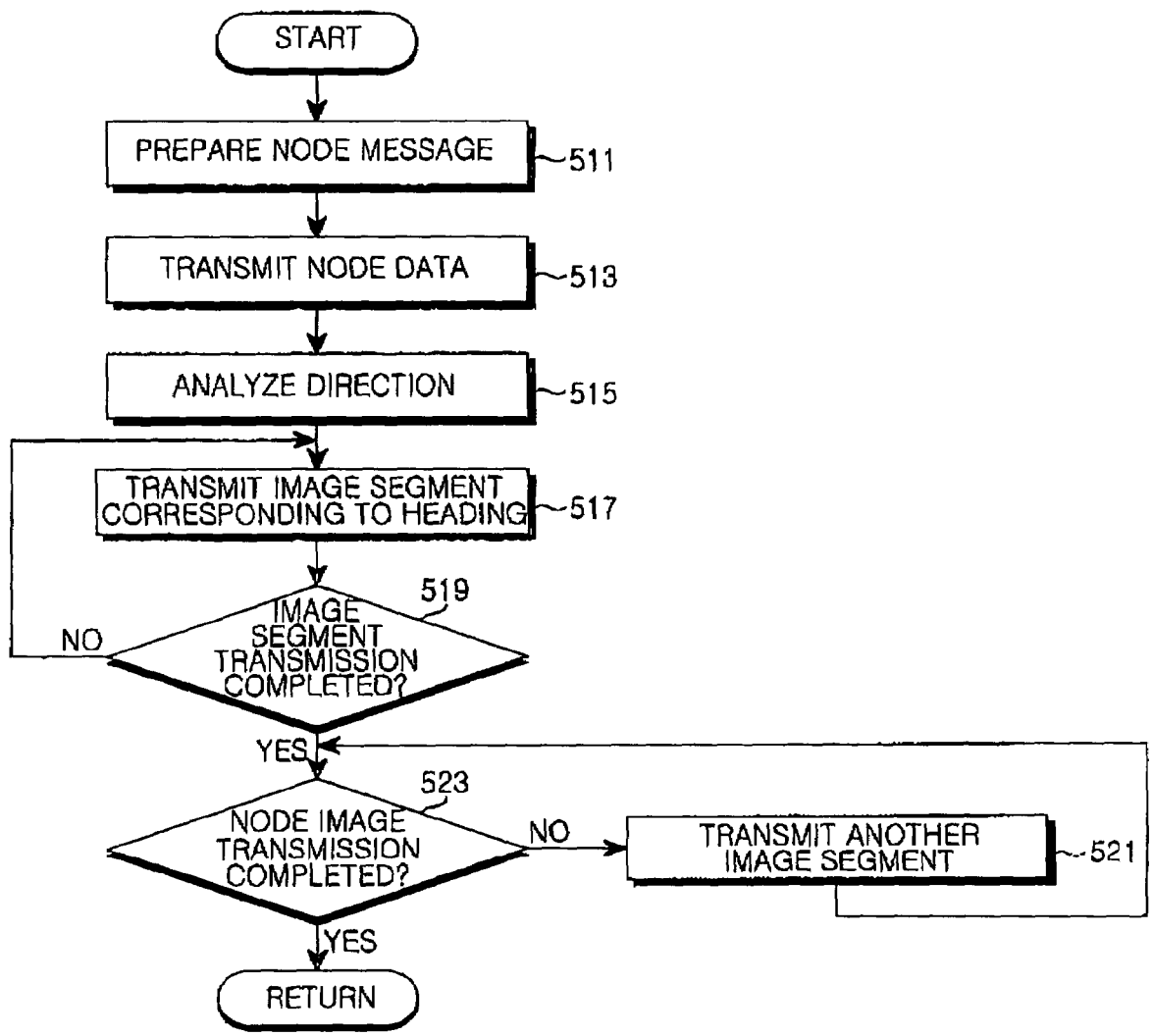
FIG. 11 is a flowchart illustrating an embodiment of an operation in the information center for transmitting image information via a node message in the operation illustrated in FIG. 10 according to an embodiment of the present invention.

Referring to FIG. 11, the information center 100 prepares the node message for the first node that the mobile terminal 300 will reach in step 511. The node message provides information about the next node that the mobile terminal 300 approaches. It includes node data and node image information. The node data has the header information, intersection name, road type, link type, angle to a near roadway at an intersection, and X-Y coordinates in a mesh of the node, as illustrated in FIG. 5. The node image information provides a photo image of the surroundings of the node. It can be a panoramic image as illustrated in FIGS. 7A, 7B and 7C. The panoramic image captures real-world scenes of the node in a 360-degree field of view. The panoramic image is assumed to be divided into 12 image segments as illustrated in FIG. 8. Because a large volume of data is involved in transmission of the entire panoramic image, the information center 100 first transmits image segments in relation to the direction of travel of the mobile terminal 300.

Therefore, the information center 100 first transmits the node data of the node message in step 513 and analyzes the direction of the mobile terminal 300 in step 515. The direction is determined by analyzing the current position and destination of the mobile terminal 300. Subsequently, the information center 100 accesses an image segment corresponding to the direction of the mobile terminal 300 and transmits the image segment to the mobile terminal 300 in step 517. For example, if the intended direction is the 6 o'clock direction, an image segment corresponding to the 6 o'clock direction is transmitted. In step 519, the information center 100 determines whether the image segment has been completely transmitted. If the transmission continues, the information center 100 returns to step 517. If the transmission is completed, the information center 100 determines whether the image information of the node has been completely transmitted in step 523. If the node image information remains to be transmitted, the information center 100 transmits the next image segment in step 521. For a panoramic image as illustrated in FIG. 7A, 7B or 7C, if the mobile terminal 300 is headed in the 6 o'clock direction, the information center 100 transmits the segments of the panoramic image in the exemplary order of 6-5-7-4-8-3-9-2-10-1-11-12, or in the exemplary order of 6-7-5-8-4-9-3-10-2-11-1-12 by repeating steps 517 to 523. If the user selects a predetermined number of, for example six image segments among the 12 segments of the panoramic image, the selected image segments can be transmitted in the exemplary order of 6-5-7-4-8-3 or in the exemplary order of 6-7-5-8-4-9.

When the entire panoramic image is transmitted in step 523, the information center 100 returns to step 421 of FIG. 10 where the position information is received.

Thus, the mobile terminal 300 stores the downloaded node message and reproduces the node data and the image segment corresponding to its direction. The image segment is for the next node that the mobile terminal 300 will reach. The mobile terminal 300 displays the node data and image segment in one of the methods illustrated in FIGS. 9A, 9B and 9C. Since the downloaded node image information provides a panoramic image as illustrated in FIG. 7A, 7B or 7C, the mobile terminal 300 can display image segments corresponding to directions other than its intended direction, when necessary.

The node message downloading procedure illustrated in FIG. 11 is applicable when the mobile terminal 300 is slow or the distance between nodes is long so that the mobile terminal 300 can receive all the node information included in the node message. On the other hand, if the mobile terminal 300 moves fast or the distance between nodes is short, there may be a shortage of time to download the entire panoramic image in the mobile terminal 300. When the mobile terminal 300 passes the node during the downloading, hence, the information center 100 discontinues transmission of the node image information and transmits the next node message to the mobile terminal 300.

Figure 12:
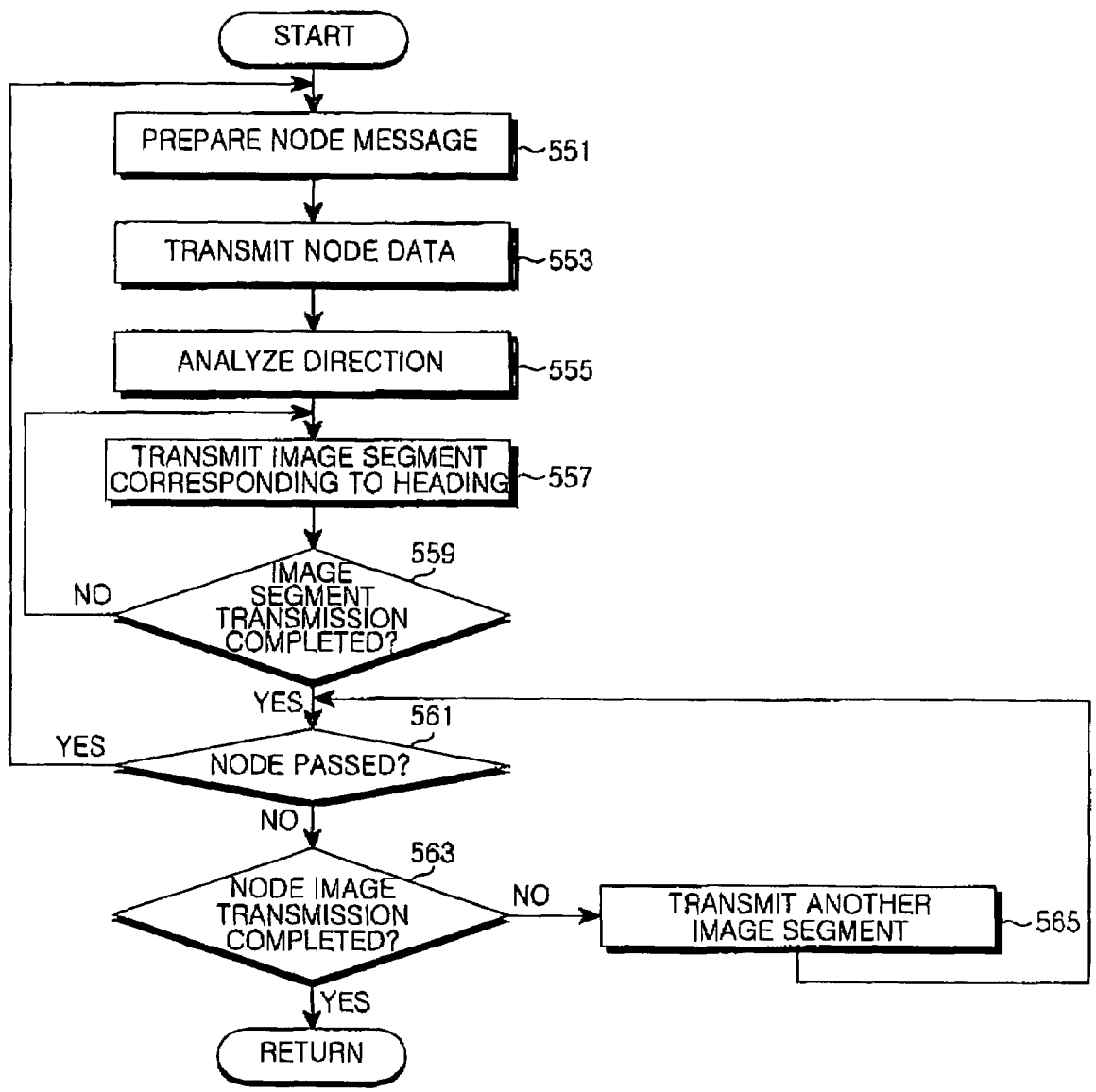
FIG. 12 is a flowchart illustrating another embodiment of the operation in the information center for transmitting image information via a node message in the operation illustrated in FIG. 10 according to an embodiment of the present invention.

FIG. 12 is a flowchart illustrating another node message transmitting method in the information center 100.

Referring to FIG. 12, steps 551 to 559 are performed in the same manner as steps 511 to 519 of FIG. 11. Thus, a detailed description of steps 551 to 559 is omitted. After transmitting an image segment corresponding to the direction of the mobile terminal 300, the information center 100 determines whether the mobile terminal has reached the node in step 561. If the mobile terminal 300 is still short of the node, the information center 100 determines whether the entire panoramic image has been transmitted in step 563. If image segments to be transmitted still remain, the information center 100 transmits an image segment corresponding to a direction other than the intended direction of the mobile terminal 300 in step 565. On the other hand, if the mobile terminal 300 has reached the node or is at a predetermined distance or nearer to the node, the information center 100 returns to step 551 and transmits the next node message. That is, when the mobile terminal 300 is at a predetermined distance or nearer to the node or passes the node for which the node message is being downloaded, the information center 100 discontinues on-going transmission of the node message and transmits the next node message.

If the mobile terminal 300 is away from the node farther than the predetermined distance, the information center 100 repeats steps 563 and 565 until the node message is completely transmitted.

Referring now to FIG. 10, after transmitting the node message, the information center 100 receives position information from the mobile terminal 300 in step 421 of FIG. 10. The position information indicates the position of the mobile terminal 300 calculated with the aid of the GPS receiver or a base station in the radio network 200. The information center 100 determines the position and direction of the mobile terminal 300 and determines whether the mobile terminal 300 is on track in step 423. If the mobile terminal 300 is off track, the information center 100 informs the mobile terminal 300 that it is off track. The mobile terminal 300 generates visual and audible alarms to the user by the display 326 and the voice processor 328 so that the user can reset the route. The information center 100 returns to step 415 in which it sets a new route from the current position to the destination. The information center 100 transmits map data including information about nodes in the new route to the mobile terminal 300 in step 417 and transmits a node message in step 419. Step 423 is performed only if the user sets the route at departure. That is, if the user sets only the destination and then moves, the information center 100 does not determine whether the mobile terminal 300 is on track or off track.

On the other hand, if the mobile terminal 300 is on track in step 423, the information center 100 determines whether the mobile terminal 300 has reached the node in step 425. If the mobile terminal 300 has not reached the node, the information center 100 returns to step 421 and tracks the movement of the mobile terminal 300. If the mobile terminal 300 has reached the node, the information center 100 determines the next node for the mobile terminal 300 to arrive at and transmits a node message for the next node to the mobile terminal in step 427. The download is performed in the procedure illustrated in FIG. 11 or FIG. 12. Therefore, the user of the mobile terminal becomes aware of the surroundings of the node from the downloaded image of the node and determines whether he is moving on track.

After transmitting the node message, the information center 100 determines whether the node that the mobile terminal 300 has reached is the last node before the destination in step 429. If the node is not the last node before the destination, the information center 100 repeats steps 421 to 427 until the mobile terminal 300 reaches the last node.

If the mobile terminal 300 reaches the last node, the information center 100 determines the position of the mobile terminal 300 in step 431 and determines whether the mobile terminal 300 is moving on track in step 433. If the mobile terminal 300 is off track, the information center 100 returns to step 415, resets a new route, and performs the procedure. On the contrary, if the mobile terminal 300 is on track, the information center 100 determines whether the mobile terminal 300 has reached the destination in step 435. At the destination, the information center 100 notifies the mobile terminal 300 that it has arrived at the destination in step 437, and the mobile terminal 300 notifies the user of the arrival at the destination.

Figure 13:
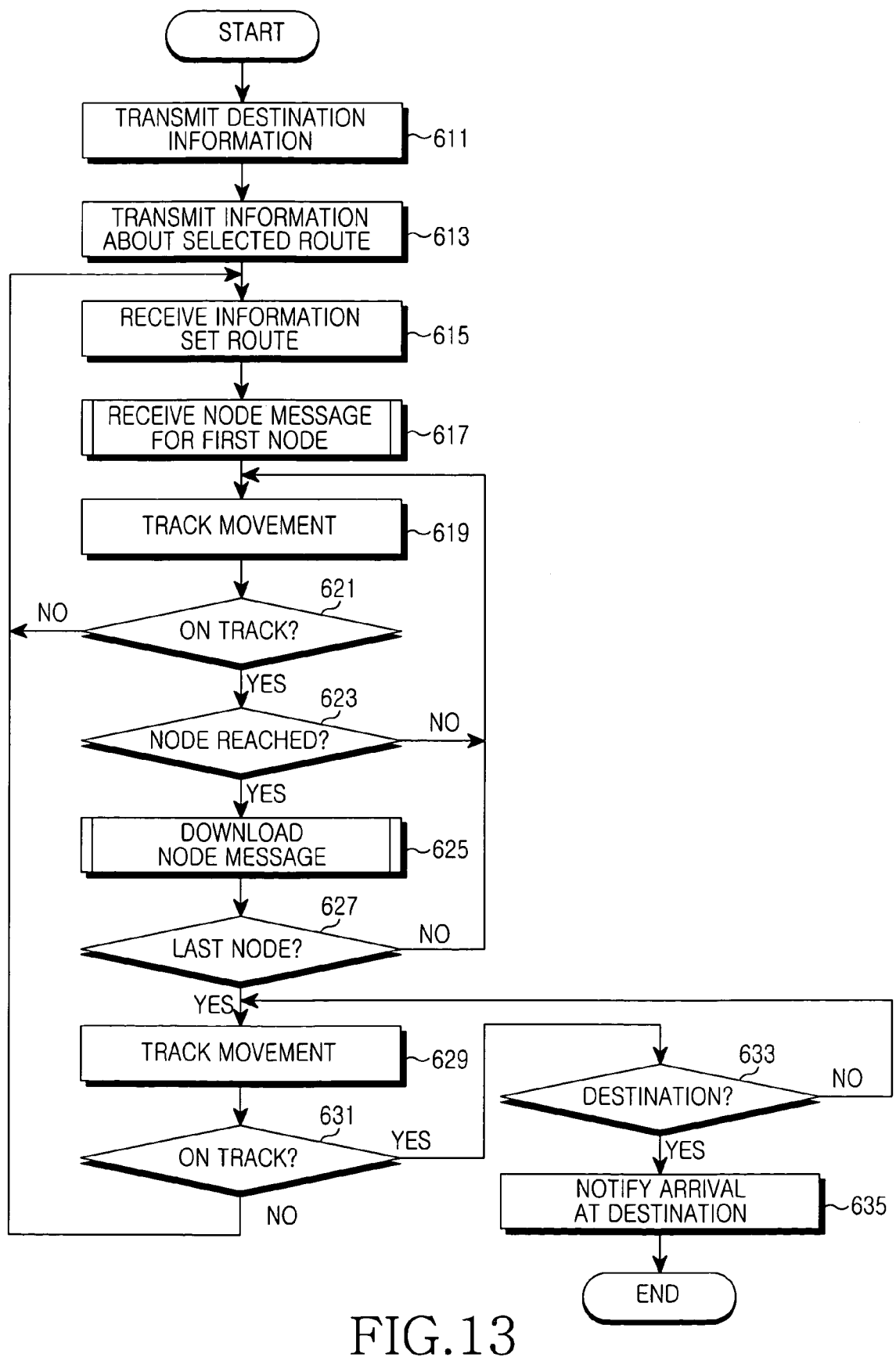
FIG. 13 is a flowchart illustrating an operation in the mobile terminal for processing information about each node along with the movement of the mobile terminal according to an embodiment of the present invention.

FIG. 13 is a flowchart illustrating an operation in the mobile terminal 300 for performing the navigation function by receiving node messages in the online mode. While the information center 100 tracks the movement of the mobile terminal 300, it determines whether the mobile terminal 300 reaches a predetermined node, and transmits a node message to the mobile terminal 300 according to the determination result in the procedure illustrated in FIG. 10. The mobile terminal 300 can determine its position and request a node message for the next node to the information center 100 referring to map data when the mobile terminal 300 reaches a node.

Referring to FIG. 13, when the user selects a navigation mode, the mobile terminal 300 transmits information about its current position and destination to the information center 100 in step 611. The destination can be set by address, geographical name, or building name. The information center 100 detects the current position and calculates routes between the current position and the destination. How the information center 100 detects the current position has been described earlier. The information center 100 determines routes between the current position and the destination using the map data storage 112 and the image information storage 122 and transmits map data including the routes and route selection information to the mobile terminal 300. The map data includes nodes for which node messages can be transmitted, as illustrated in FIG. 4A. It may have a plurality of routes from the current position to the destination.

The mobile terminal 300 selects an intended route in the map data and notifies the information center 100 of the selected route in step 613. The information center 100 determines the selected route as the route for the mobile terminal 300 and transmits map data having the determined route. The mobile terminal 300 receives the map data from the information center 100 in step 615. This map data has nodes marked in the determined route as illustrated in FIG. 4B.

Steps 613 and 615 can be omitted. In this case, the information center 100 transmits the map data illustrated in FIG. 4A to the mobile terminal 300 and transmits the mobile terminal 300 a node message for the next node each time the mobile terminal 300 reaches a node.

In step 617, the mobile terminal 300 transmits to the information center 100 information about the position of the first node that it will reach, requesting download of a node message for the node. The information center 100 transmits the node message to the mobile terminal 300. Thus, the mobile terminal 300 reproduces the node message. The node message includes node data and node image information as illustrated in FIG. 5. The node image information can be a 360-degree panoramic image as illustrated in FIGS. 6 to 7C.

Figure 14:
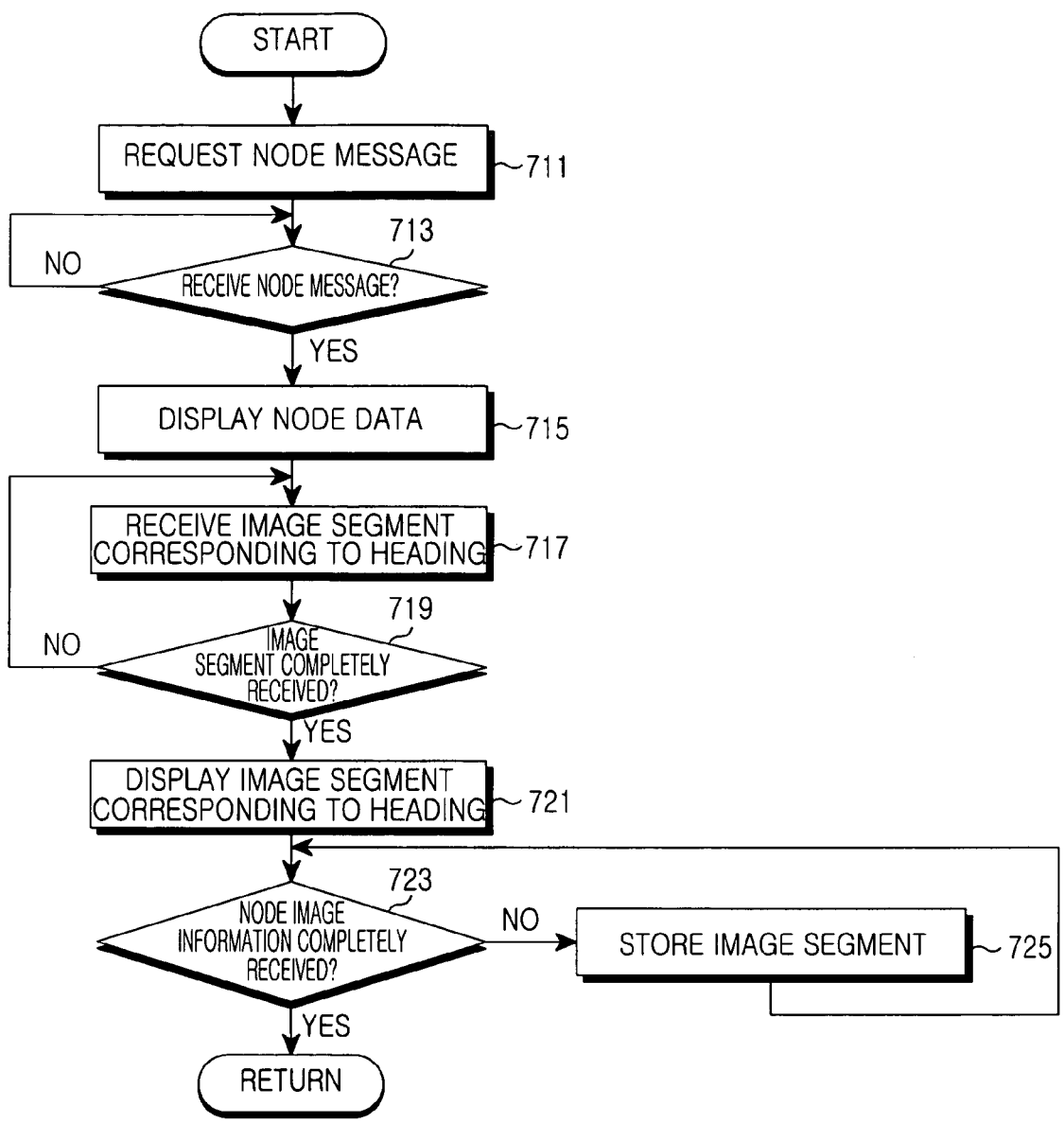
FIG. 14 is a flowchart illustrating an embodiment of an operation in the mobile terminal for receiving image information via a node message in the operation illustrated in FIG. 13 according to an embodiment of the present invention.
Figure 15:
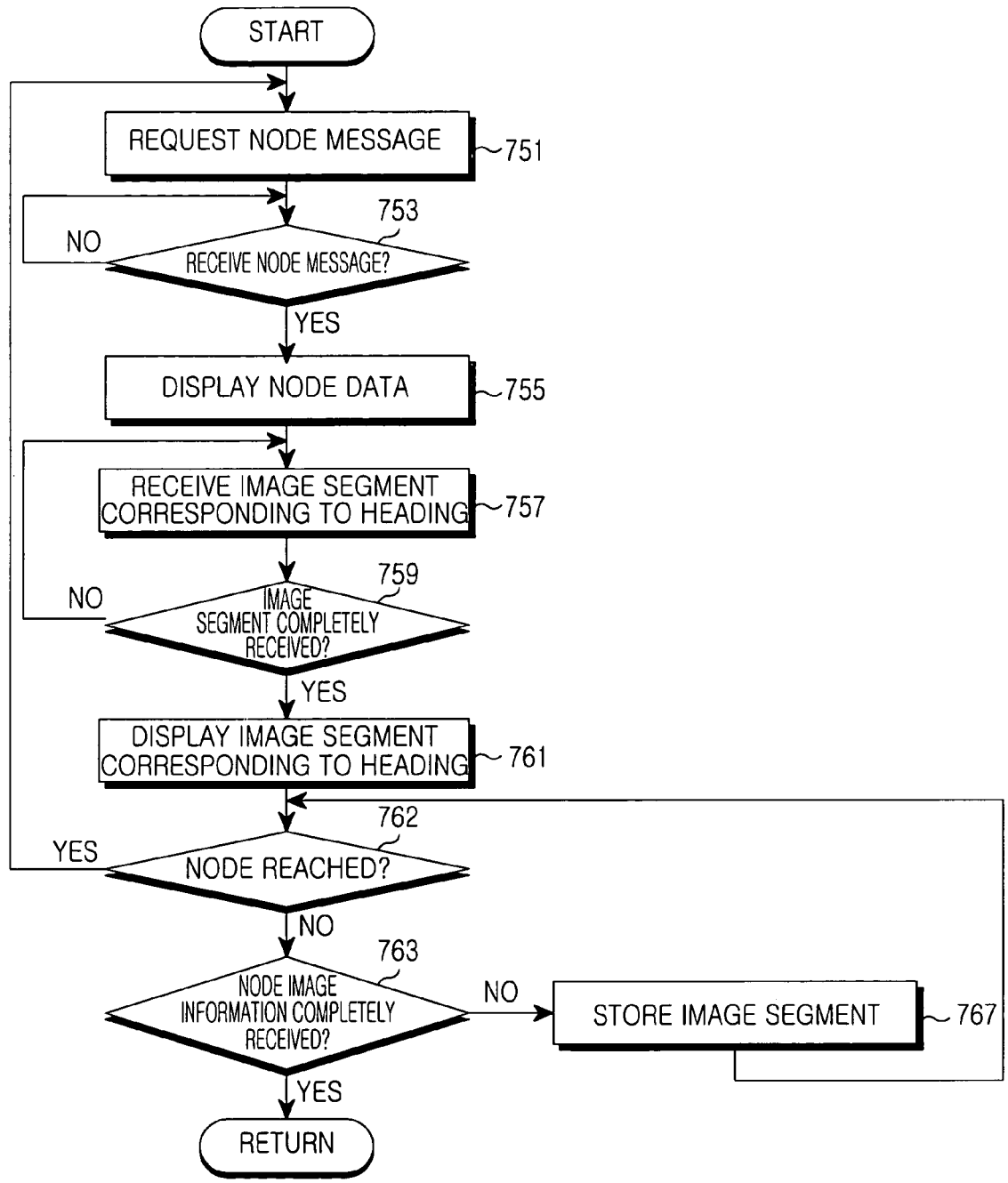
FIG. 15 is a flowchart illustrating another embodiment of the operation in the mobile terminal for receiving image information by a node message in the operation illustrated in FIG. 13 according to an embodiment of the present invention.

The node message can be downloaded in a procedure illustrated in FIG. 14 or FIG. 15.

Referring to FIG. 14, the mobile terminal 300 requests a download of the node message for the first node to be reached in step 711. The node message provides information about the next node that the mobile terminal 300 approaches. It includes node data and node image information. Because a large volume of data is involved in transmission of an entire panoramic image of the node, the information center 100 first transmits an image segment in relation to the direction of the mobile terminal 300 and then image segments in relation to other directions.

Therefore, the information center 100 first transmits the node data of the node message. Then it sequentially transmits an image segment corresponding to the direction of the mobile terminal 300 and image segments corresponding to other directions adjacent to the current direction. Upon receipt of the node message in step 713, the mobile terminal 300 displays the node data in step 715. In steps 717 to 721, the mobile terminal 300 receives an image segment corresponding to its direction and displays the image segment. Subsequently, the mobile terminal 300 receives and stores image segments corresponding to other directions than the direction in step 723 and 725.

After completely downloading all image segments of the node, the mobile terminal 300 stores the panoramic image as illustrated in FIGS. 7A, 7B and 7C. If the mobile terminal 300 determines that the panoramic image has completely been received, it returns to step 619 in FIG. 13 where the mobile terminal's 300 movements are tracked.

The mobile terminal 300 stores the node message downloaded in the procedure of FIG. 14 and reproduces the node data of the node message and the image segment corresponding to its direction. This image segment is about the next node that the mobile terminal 300 will reach. The mobile terminal 300 can display the node data and image segment in one of the methods illustrated in FIGS. 9A, 9B and 9C. Since the downloaded node image information provides the panoramic image as illustrated in FIG. 7A, 7B or 7C, the mobile terminal 300 can display image segments in directions other than its intended direction when necessary.

The node message downloading procedure illustrated in FIG. 14 is applicable when the mobile terminal 300 is slow or the distance between nodes is long so that the mobile terminal 300 can receive all the node information included in the node message. On the other hand, if the mobile terminal 300 moves fast or the distance between nodes is short, there may be a shortage of time to download the entire panoramic image in the mobile terminal 300. When the mobile terminal 300 reaches the node during the downloading, hence, the information center 100 discontinues transmission of the node image information and transmits the next node message for a corresponding node to the mobile terminal 300.

FIG. 15 is a flowchart illustrating another node message receiving method in the mobile terminal 300.

Referring to FIG. 15, steps 751 to 761 are performed in the same manner as steps 711 to 721 of FIG. 14. Thus, a detailed description of steps 751 to 761 are omitted. Displaying an image segment corresponding to its direction, the mobile terminal 300 determines whether it has reached the node in step 762. If the mobile terminal 300 is short of the node, the mobile terminal 300 downloads image segments corresponding to directions other than its intended direction in steps 763 to 767. On the other hand, if the mobile terminal 300 passes the node or is at a predetermined distance or nearer to the node, it returns to step 751 and requests a node message for the next node to the information center 100. That is, when the mobile terminal 300 is at a predetermined distance or nearer to the node or passes the node for which the node message is being downloaded, it requests to the information center 100 discontinuation of on-going transmission of the node message and download of a node message for the next node.

Referring now to FIG. 13, after downloading the node message, the mobile terminal 300 tracks its movement in step 619. That is, the mobile terminal 300 calculates its position with the aid of the GPS receiver or a base station in the radio network 200. The mobile terminal 300 determines whether it is on track in step 621, while tracking the movement. If the mobile terminal 300 is off track, it generates visual and audible alarms to the user by the display 326 and the voice processor 328 so that the user can reset the route. Thus, the mobile terminal 300 detects the off track state in step 621 and returns to step 615. The mobile terminal 300 sets a new route from the current position to the destination, displays map data including information about nodes in the new route, and repeats the above procedure.

On the other hand, if the mobile terminal 300 is on track in step 621, it determines whether it has reached the node in step 623. If the mobile terminal 300 has not reached the node yet, it returns to step 619 and tracks its movement. If the mobile terminal 300 has reached the node, it determines the next node to arrive at. The mobile terminal 300 transmits position information about the next node to the information center 100, requesting a node message for the next node. The download of the node message is performed in the procedure illustrated in FIG. 14 or FIG. 15.

After downloading the node message in step 625, the mobile terminal 300 determines whether the node that it has reached is the last node before the destination in step 627. If the node is not the last node, the mobile terminal 300 repeats steps 619 to 627 until it reaches the last node.

If the mobile terminal 300 reaches the last node, it tracks its movement in step 629 and determines whether it is moving on track in step 631. If the mobile terminal 300 is on track, it determines whether it has reached the destination in step 633. At the destination, the mobile terminal 300 notifies the user of the arrival at the destination in step 635.

Figure 16:
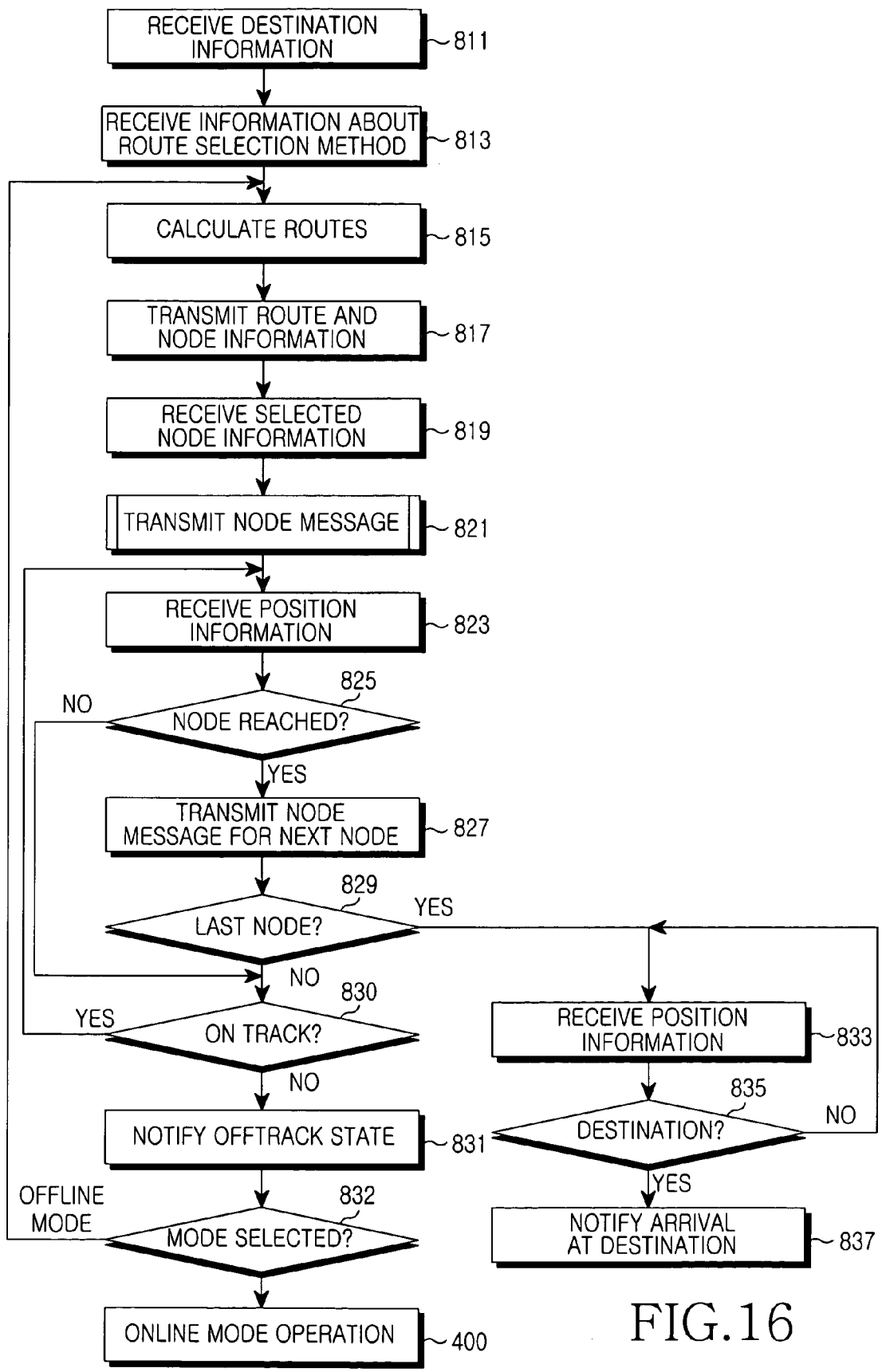
FIG. 16 is a flowchart illustrating an operation in the information center for transmitting route setting information and node information to the mobile terminal according to another embodiment of the present invention.

FIG. 16 is a flowchart illustrating an operation in the information center for providing an offline navigation service according to another embodiment of the present invention. In this procedure, the information center 100 sets a route based on position information received from the mobile terminal 300, tracks a route that the mobile terminal 300 takes, transmits a node message for the next node to a node that the mobile terminal 300 reaches, and resets a route according to a user-selected route if the mobile terminal 300 is off track. That is, if the mobile terminal 300 is off track in the offline mode, the information center 100 receives information about a route selected by the user from the mobile terminal 300 and resets a route offline, or the information center 100 detects the position of the mobile terminal 300 and automatically sets a route online.

Referring to FIG. 16, when the user selects a navigation mode, the mobile terminal 300 transmits information about its current position and destination to the information center 100. The destination can be set by address, geographical name, or building name. The information center 100 receives the current position and destination information from the mobile terminal 300 in step 811. In step 813, the information center 100 receives information about route selection. In step 815, the information center 100 detects the current position and calculates routes between the current position and the destination and transmits the route information to the mobile terminal 300.

Upon receipt of route selection information from the mobile terminal 300, the information center 100 transmits to the mobile terminal 300 map data having the selected route and nodes for which VR service is available in the route, as illustrated in FIG. 4A, in step 817.

The mobile terminal 300 selects nodes for which node messages are to be downloaded in the map data by node numbers or node names. In step 819, the information center 100 receives the node selection information and generates map data as illustrated in FIG. 4B. The map data is shared between the information center 100 and the mobile terminal 300. Once the nodes for which node messages are to be generated are determined, a route to the destination is set for the mobile terminal 300.

In step 821, the information center 100 transmits to the mobile terminal 300 a node message for the first node that the mobile terminal 300 will reach. The mobile terminal 300 displays the node message. The node message includes node data and node image information as illustrated in FIG. 5. The node message can be downloaded in the procedure illustrated in FIG. 11 or FIG. 12.

After transmitting the node message, the information center 100 receives position information from the mobile terminal 300 in step 823. The position information indicates the position of the mobile terminal 300 calculated with the aid of the GPS receiver or a base station in the radio network 200. The information center 100 determines whether the mobile terminal 300 has reached the node in step 825. If the mobile terminal 300 has not reached the node, the information center 100 determines whether the mobile terminal 300 is on track in step 830. If the mobile terminal 300 is on track, the information center 100 returns to step 823.

In steps 823 to 830, the information center 100 receives position information from the mobile terminal 300 and transmits a node message to the mobile terminal 300. In the mean time, the mobile terminal 300 can determine whether it has reached the node and whether it is on track. In this case, if the mobile terminal 300 has reached the node, it notifies the information center 100 that it is positioned at the node, requesting a node message for the next node. If the mobile terminal 300 is off track, it transmits a message indicating the off track state and requesting route setting to the information center 100. The information center 100 then recognizes that the mobile terminal 300 is at the node in steps 823 and 825 and transmits a node message for the next node to the mobile terminal 300 in step 827. When the mobile terminal 300 notifies the information center 100 of the off track state, the information center 100 recognizes it in steps 830 and 831. When the online mode is selected, the information center 100 proceeds to step 400 of FIG. 10.

However, if the mobile terminal 300 is off track, the information center 100 recognizes it in step 830 and notifies the mobile terminal 300 of the off track state in step 831. Then the mobile terminal 300 generates visual and audible alarms to the user by the display 326 and the voice processor 328. Here, the user can reset the route. If the offline mode is selected, the information center 100 transmits map data as illustrated in FIG. 4A and repeats steps 815 to 819. Thus, the mobile terminal 300 selects nodes for which node messages are to be generated, as illustrated in FIG. 4B. On the other hand, in the online mode, the information center 100 resets a route from the current position to the destination in step 415 of FIG. 10 and transitions the navigation mode to the online mode.

Determining that the mobile terminal 300 reaches the node point in step 825, the information center 100 generates a node message for the next node and transmits node data and node image information to the mobile terminal 300 by the node message in the method illustrated in FIG. 11 or 12 in step 827. After transmitting the node message, the information center 100 determines whether the node that the mobile terminal 300 has reached is the last node in step 829. If the node is not the last node, the information center 100 determines whether the mobile terminal 300 is on track in step 830. If the mobile terminal 300 is on track, the information center 100 repeats steps 823 to 829 until the mobile terminal 300 reaches the last node.

If the mobile terminal 300 reaches the last node, the information center 100 determines the position of the mobile terminal 300 in step 833 and determines whether the position is identical to the destination in step 835. At the destination, the information center 100 notifies the mobile terminal 300 that it has arrived at the destination in step 837, and the mobile terminal 300 notifies the user of the arrival at the destination.

The offline navigation service is provided in a similar manner to the online navigation service. Even after a route is set, the mobile terminal 300 transmits position information to the information center 100. The information center 100 detects the position of the mobile terminal 300 and transmits a node message when the mobile terminal 300 reaches a node. When the mobile terminal 300 is off track, the information center 100 automatically resets the route and continues the navigation service in the online mode, whereas the user of the mobile terminal 300 resets the route in the offline mode.

Figure 17:
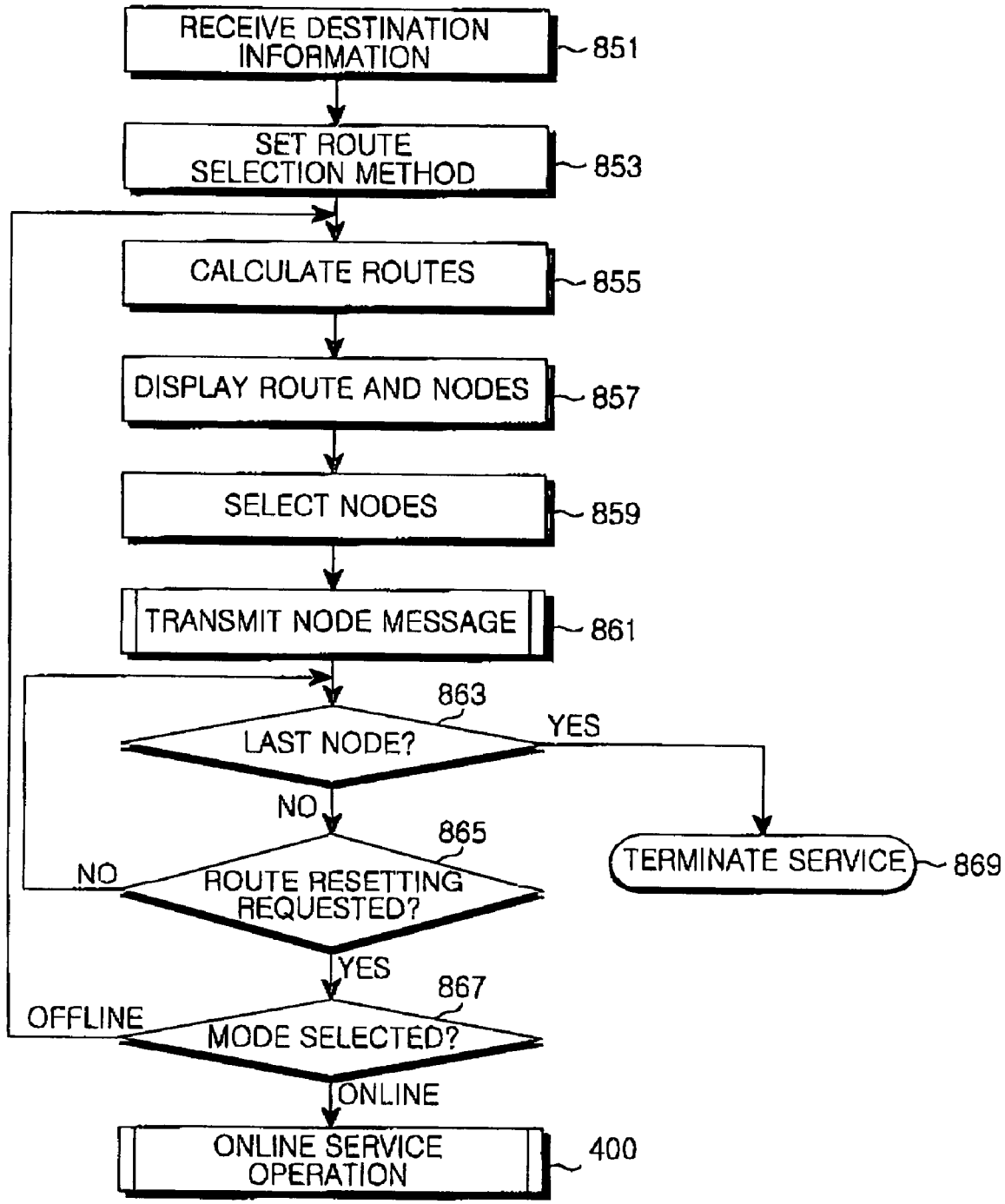
FIG. 17 is a flowchart illustrating an operation in the information center for transmitting route setting information and node information to the mobile terminal according to another embodiment of the present invention.

The offline navigation service can also be provided in the procedure illustrated in FIG. 17. FIG. 17 is a flowchart illustrating an operation in the information center 100 for providing an offline navigation service in the case where the mobile terminal 300 receives node messages for all nodes when a route is set between the information center 100 and the mobile terminal 300 and determines whether it is on track or off track.

Referring to FIG. 17, when the navigation mode is set, the mobile terminal 300 transmits information about its current position and destination to the information center 100. The destination can be set by address, geographical name, or building name. The information center 100 receives the current position and destination information from the mobile terminal 300 in step 851. It detects the current position and calculates a route between the current position and the destination. The current position is detected by receiving the information about the current position (longitude and latitude) and the destination, searching the map data storage 112 for a matching geographical name or facility information item, and converting the searched item to longitude and latitude coordinates. Upon receipt of route selection information from the mobile terminal 300 in step 853, the information center 100 calculates routes and transmits map data including the routes and nodes for which VR service is available to the mobile terminal 300 in step 855. The mobile terminal 300 displays the map data and the information center 100 waits until a node select signal is generated from the mobile terminal 300 in step 857. The map data contains nodes for which node messages can be transmitted, as illustrated in FIG. 4A.

The mobile terminal 300 can select intended nodes in the map data by entering their numbers or names. Then, the mobile terminal 300 notifies the information center 100 of the selected nodes. The information center 100 generates map data illustrating the selected nodes as illustrated in FIG. 4B, in step 859. The map data is shared between the information center 100 and the mobile terminal 300. The selected nodes form a route for the mobile terminal 300.

The mobile terminal 300 requests node messages for all the selected nodes. The information center 100 then sequentially transmits the node messages to the mobile terminal 300 in step 861. Each of the node messages includes node data and node image information as illustrated in FIG. 5. The header of the node data includes the node number of the node message. The mobile terminal 300 stores the node messages in its memory. Thus, the information center 100 transmits all node messages for the selected nodes marked on the map to the mobile terminal 300 in the offline mode.

The information center 100 discontinues the navigation service until receiving a route reset request or a notification of arrival at the last node from the mobile terminal 300. If the information center 100 receives the route reset request from the mobile terminal 200, it determines whether the route setting is offline or online in step 865. If it is offline, the information center 100 returns to step 855 and resets the route, to thereby resume the navigation service. If the mobile terminal 300 is off track, the information center 100 analyzes nodes selected between the current position and the destination. If there are nodes for which node messages have already been transmitted, the node messages are not transmitted again. If the destination is changed during the route resetting, the information center 100 returns to step 851 to repeat the above procedure in step 867.

When the mobile terminal 300 reaches the last node, it notifies the information center 100 of the arrival at the last node. The information center 100 then terminates the offline navigation service in step 869.

Figure 18:
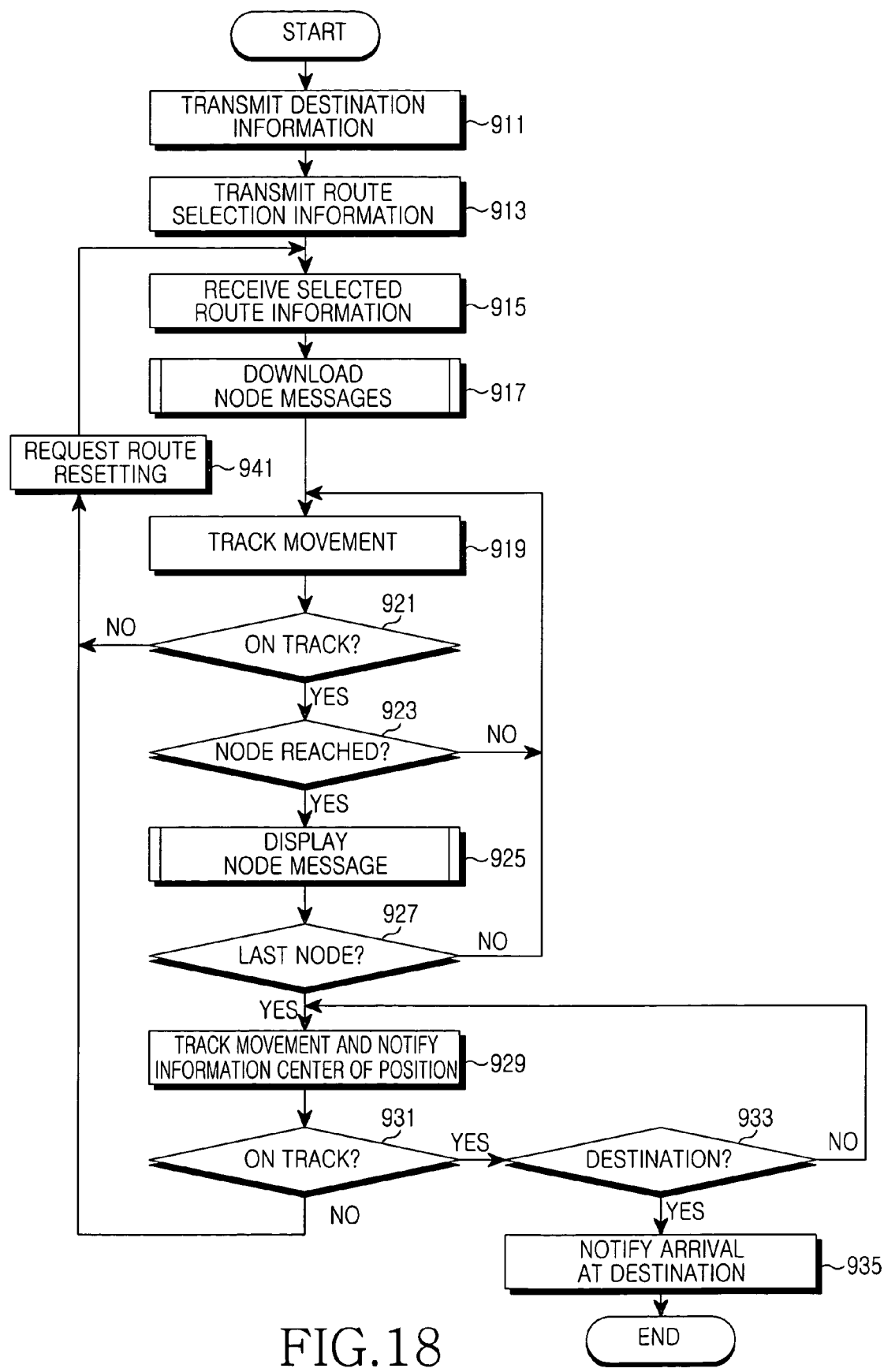
FIG. 18 is a flowchart illustrating an operation in the mobile terminal for processing information about each node along with the movement of the mobile terminal according to an embodiment of the present invention.

FIG. 18 is a flowchart illustrating an operation in the mobile terminal 300 for processing a node message in the offline navigation service illustrated in FIG. 17. While the information center 100 tracks the movement of the mobile terminal 300, determines whether the mobile terminal 300 reaches a node, and transmits a node message to the mobile terminal in the procedure illustrated in FIG. 10, the mobile terminal 300 itself determines its position and requests route resetting to the information center 100 when it is off track in the procedure illustrated in FIG. 18.

Referring to FIG. 18, when the user selects a navigation mode, the mobile terminal 300 transmits information about its current position and destination to the information center 100 in step 911. The destination can be set by address, geographical name, or building name. The information center 100 calculates routes between the current position and the destination using the map data storage 112 and the image information storage 122 and transmits map data including the routes and route selection information to the mobile terminal 300. The map data contains nodes for which node messages can be transmitted, as illustrated in FIG. 4A. It may have a plurality of routes from the current position to the destination.

The mobile terminal 300 makes choices for route setting regarding the shortest time, the shortest route, roads to take (highway or local roads) in the map data received from the information center 100 in step 913. The mobile terminal 300 selects one of the routes on the map and notifies the information center 100 of the selected route. The information center 100 confirms the selected route as the route for the mobile terminal 300 and transmits map data illustrating the determined route. The mobile terminal 300 receives the map data from the information center 100 in step 915. This map data has nodes marked in the determined route as illustrated in FIG. 4B.

Steps 913 and 915 can be omitted. In this case, the information center 100 transmits the map data as illustrated in FIG. 4A to the mobile terminal 300 and transmits the mobile terminal 300 a node message for the next node each time the mobile terminal 300 reaches a node.

If the mobile terminal 300 has map data including nodes in the map data storage 318, steps 911 to 915 can be omitted. That is, when the mobile terminal 300 has the map data, it displays the map data as illustrated in FIG. 4A according to a destination entered by the user and also displays the map data as illustrated in FIG. 4B according to a route selected by the user.

The mobile terminal 300 stores node messages downloaded from the information center 100 in the memory 322 or the map data storage 318 in step 917. Each of the node messages includes node data and node image information as illustrated in FIG. 5. The number of the node messages is equal to that of the selected nodes. After completely receiving the node messages, the mobile terminal 300 displays an image of the first node on the display 326 and tracks its movement in step 919. Since the node image information is a panoramic image as illustrated in FIG. 7A, 7B or 7C, the mobile terminal 300 can display image segments corresponding to directions other than its intended direction, when necessary.

After downloading the node messages, the mobile terminal 300 tracks its movement. That is, the mobile terminal 300 calculates its position with the aid of the GPS receiver or a base station in the radio network 200. In step 921, the mobile terminal 300 determines whether it is on track, while tracking the movement. If the mobile terminal 300 is off track, it generates visual and audible alarms to the user by the display 326 and the voice processor 328 so that the user can reset the route. Thus, the mobile terminal 300 detects the off track state in step 921 and requests route resetting to the information center 100 in step 941. Upon receipt of information indicating a reset route from the information center 100, the mobile terminal 300 sets a new route from the current position to the destination in step 915, displays map data including node information in the new route, and repeats the above procedure.

On the other hand, if the mobile terminal 300 is on track in step 921, it determines whether it has reached the node in step 923. If the mobile terminal 300 has not reached the node yet, it returns to step 919 and tracks its movement. If the mobile terminal 300 has reached the node, it determines the next node to arrive at, accesses node image information about the next node, and displays it in step 925. Then, the mobile terminal 300 determines whether the node that it has reached is the last node in step 927. If the node is not the last node, the mobile terminal 300 repeats steps 919 to 927 until it reaches the last node.

If the mobile terminal 300 reaches the last node, it tracks its movement in step 929 and determines whether it is moving on track in step 931. If the mobile terminal 300 is off track, it requests route resetting to the information center 100 in step 941, resets a route based on route resetting information received from the information center 100, and resumes the route service. If the mobile terminal 300 is on track, it determines whether it has reached the destination in step 933. At the destination, the mobile terminal 300 notifies the user of the arrival at the destination in step 935.

As described above, the present invention advantageously allows a user of a mobile terminal to view real-world scenes to come according to the current position of the mobile terminal received from a GPS receiver and the direction of the mobile terminal. Therefore, the user can see the geographical features of a node that the user is moving toward. The geographical features of the node can be displayed in an ordinary photo image or in a panoramic image. Depending on the amount of the data of the image information and the velocity of the mobile terminal, a segment of the image information corresponding to the direction of the mobile terminal can be downloaded with priority. In the case of a panoramic image, image segments corresponding to directions other than the heading of the mobile terminal can also be displayed.

While the invention has been shown and described with reference to certain embodiments thereof, it should be understood by those skilled in the art that various changes in form and details may be made therein without departing from the spirit and scope of the invention as defined by the appended claims.

What is claimed is:

1. In a navigation system having an information center and a mobile terminal, the information center including a database for storing node messages with each node message including node photographic image information and node data about the geographical features of a node and a database for storing map data, the node photographic image information being divided into photographic image segments corresponding to directions, a method of processing position information in the information center, comprising:
    setting a route according to a current position and a destination of the mobile terminal wherein a user can select desired nodes, generating map data including the route and a plurality of selected nodes in the route, and transmitting the map data to the mobile terminal;
    transmitting a node message for the first of the selected nodes to the mobile terminal;
    tracking the movement of the mobile terminal and transmitting a node message for a next selected node to a node where the mobile terminal is currently positioned, based on said movement; and
    terminating transmission of the node messages when the mobile terminal reaches the last of the plurality of selected nodes.

2. The method of claim 1, further comprising returning to the route setting step when the mobile terminal is off track.

3. The method of claim 1, wherein each of the node data includes a node name, a road type, and a link type and the node photographic image information comprises a 360-degree panoramic photographic image of a node divided into photographic image segments corresponding to directions.

4. The method of claim 3, wherein transmitting the node message comprises:
    transmitting the node data of the node message when the mobile terminal reaches the node;
    determining the direction of the mobile terminal and transmitting a photographic image segment of the node photographic image information corresponding to the direction of the mobile terminal; and
    sequentially transmitting photographic image segments corresponding to directions adjacent to the direction the mobile terminal is traveling in.

5. The method of claim 1, wherein each of the nodes comprises at least one of an intersection, a tollgate, an interchange, and a waypoint near the destination.

6. The method of claim 1, wherein transmitting the node message comprises discontinuing the transmission of the node photographic image information when the mobile terminal passes through the node during the transmission and transmitting a node message for the next node.

7. In a navigation system having an information center and a mobile terminal, the information center including a database for storing node messages with each node message including node photographic image information and node data about the geographical features of a node and a database for storing map data, the node photographic image information being divided into photographic image segments corresponding to directions, a method of displaying position information in the mobile terminal, comprising:
    transmitting navigation information including a current position and a destination to the information center;
    receiving map data including a route, from the current position to the destination, and user selected desired nodes in the route from the information center;
    displaying a node message for the first of the selected nodes received from the information center;
    tracking the movement of the mobile terminal, requesting a node message from the information center for a next selected node to be reached by the mobile terminal, and downloading the node message from the information center, and displaying the node message; and
    terminating the download of the node message when the mobile terminal reaches the last of the selected nodes, and notifying arrival at the destination on a display when the mobile terminal reaches the destination.

8. The method of claim 7, further comprising retransmitting the navigation information for route resetting when the mobile terminal is off track.

9. The method of claim 7, wherein the node data includes a node name, a road type, and a link type and the node photographic image information comprises a 360-degree panoramic photographic image of a node divided into photographic image segments corresponding to directions.

10. The method of claim 9, wherein downloading the node message comprises:
    downloading the node data of the node message when the mobile terminal reaches the node;
    displaying the node data of the node message;
    receiving a photographic image segment of the node photographic image information corresponding to the direction the mobile terminal is traveling in and displaying the photographic image segment; and
    sequentially receiving photographic image segments corresponding to directions adjacent to the direction the mobile terminal is traveling in, while displaying the photographic image segment corresponding to the direction the mobile terminal is traveling in, and storing the received photographic image segments.

11. The method of claim 9, wherein each of the nodes comprises at least one of an intersection, a tollgate, an interchange, and a waypoint near the destination.

12. A navigation system for displaying position information including a photographic image, the system comprising:
    a mobile terminal; and
    an information center for setting a route according to a current position and a destination of the mobile terminal, generating map data including the route and a plurality of user selected desired nodes in the route, and transmitting the map data to the mobile terminal, transmitting a node message for the first of the selected nodes to the mobile terminal, tracking the movement of the mobile terminal and transmitting a node message for a next selected node to a node where the mobile terminal is currently positioned, based on said movement, and terminating transmission of the node messages when the mobile terminal reaches the last of the nodes, wherein the information center includes a database for storing node messages with each node message including node photographic image information and node data about the geographical features of a node and a database for storing map data, the node photographic image information being divided into photographic image segments corresponding to directions.

13. The system of claim 12, wherein the information center returns to route setting when the mobile terminal is off track.

14. The system of claim 12, wherein the node data includes a node name, a road type, and a link type and the node photographic image information comprising a 360-degree panoramic photographic image of a node divided into photographic image segments corresponding to directions.

15. The system of claim 14, wherein the information center transmits the node data of the node message when the mobile terminal reaches the node, determines the direction of the mobile terminal and transmit a photographic image segment of the node photographic image information corresponding to the direction of the mobile terminal, and sequentially transmits photographic image segments corresponding to directions adjacent to the direction the mobile terminal is traveling in.

16. The system of claim 12, wherein each of the nodes comprises at least one of an intersection, a tollgate, an interchange, and a waypoint near the destination.

17. The system of claim 12, wherein the information center discontinues the transmission of the node photographic image information when the mobile terminal passes through the node during the transmission and transmit a node message for the next node.

18. In a navigation system having an information center and a mobile terminal, the information center including a database for storing node messages with each of the node messages including node photographic image information and node data about the geographical features of a node and a database for storing map data, the node photographic image information being divided into photographic image segments corresponding to directions, a method of processing position information in the navigation system, comprising:

transmitting navigation information including a current position and a destination to the information center;

setting a route according to a current position and a destination of the mobile terminal, generating map data including the route and a plurality of user selected desired nodes in the route, and transmitting the map data to the mobile terminal;

transmitting a node message for the first of the selected nodes to the mobile terminal;

receiving map data including a route from the current position to the destination and selected nodes in the route from the information center;

displaying a node message for the first of the selected nodes received from the information center;

tracking the movement of the mobile terminal;

requesting a node message from the information center for a next selected node to be reached by the mobile terminal;

transmitting a node message for a next selected node to a node where the mobile terminal is currently positioned, based on said movement;

downloading the node message from the information center;

displaying the node message;

terminating the transmission and downloading of the node messages when the mobile terminal reaches the last of the plurality of selected nodes; and notifying arrival at the destination on a display when the mobile terminal reaches the destination.

* * * * *